United States Patent [19]

Rayment

[11] Patent Number: 4,576,071
[45] Date of Patent: Mar. 18, 1986

[54] FOOD PRODUCT DEFECT SENSOR AND TRIMMER APPARATUS

[75] Inventor: Arthur G. Rayment, Santa Clara, Calif.

[73] Assignee: Lamb-Weston, Inc., Portland, Oreg.

[21] Appl. No.: 520,244

[22] Filed: Aug. 4, 1983

[51] Int. Cl.⁴ .............................................. B26D 5/34
[52] U.S. Cl. .......................................... 83/71; 83/104;
83/364; 83/365; 83/371
[58] Field of Search ................ 83/71, 104, 155, 155.1,
83/371, 286, 289, 293, 315, 338, 364, 365, 578,
353, 556, 607; 250/572; 356/237

[56] References Cited
U.S. PATENT DOCUMENTS

| 2,451,948 | 10/1948 | Hawthorne | 83/338 |
| 2,846,002 | 8/1958 | Farmwald | 83/578 |
| 3,382,975 | 5/1968 | Hoover | 209/73 |
| 3,664,397 | 5/1972 | Raye | 83/371 X |
| 3,746,575 | 7/1973 | Arnaudin, Jr. et al. | 250/572 |
| 3,750,883 | 8/1973 | Irving et al. | 209/111.6 |
| 4,044,639 | 8/1977 | Kato | 83/371 X |
| 4,048,885 | 9/1977 | Miyakita | 83/578 X |
| 4,114,488 | 9/1978 | Vornfett | 83/198 |
| 4,147,619 | 4/1979 | Wassmer et al. | 209/565 |
| 4,186,836 | 2/1980 | Wassmer et al. | 209/565 |
| 4,251,555 | 2/1981 | Kroenig | 426/231 |
| 4,351,232 | 9/1982 | Kroenig | 99/540 |
| 4,385,700 | 5/1983 | Hodges et al. | 209/539 |
| 4,520,702 | 6/1985 | Davis et al. | 83/303 |

FOREIGN PATENT DOCUMENTS 1349361  4/1974  United Kingdom ................ 83/578

Primary Examiner—James M. Meister
Attorney, Agent, or Firm—Klarquist, Sparkman, Campbell, Leigh & Whinston

[57] ABSTRACT

The food product sensor and trimmer apparatus and method may be used to detect and remove defects from french fried potato strips or other elongated food products as they are conveyed in separate channels on a conveyor belt. Such apparatus comprises a defect sensor for each channel including a plurality of light detectors which detect two different wavelength light bands, such as visible light and infrared light, reflected from the surface of the food product to determine the length of the product, the size of the defect and the position of the defect on the product. Visible light and near infrared light are reflected from the product and sensed by different detectors and the ratio of detected visible light to infrared light determined to detect defects and locate them relative to the opposite ends of the product. An improved cutter is employed in each channel to remove the defects from the article including a knife which may have a single pivoted knife blade and a control for reciprocating such blades back and forth across the path of the product so that the blade is capable of making two or more cuts per product. The spacing distance between such cuts is adjusted by the control to remove defects of different length with less waste when they occur in the middle of the product. The control for each cutter includes a data processor circuit receiving data input signals from the sensor means associated with such cutter.

10 Claims, 18 Drawing Figures

Microfiche Appendix Included
(2 Microfiche, 79 Pages)

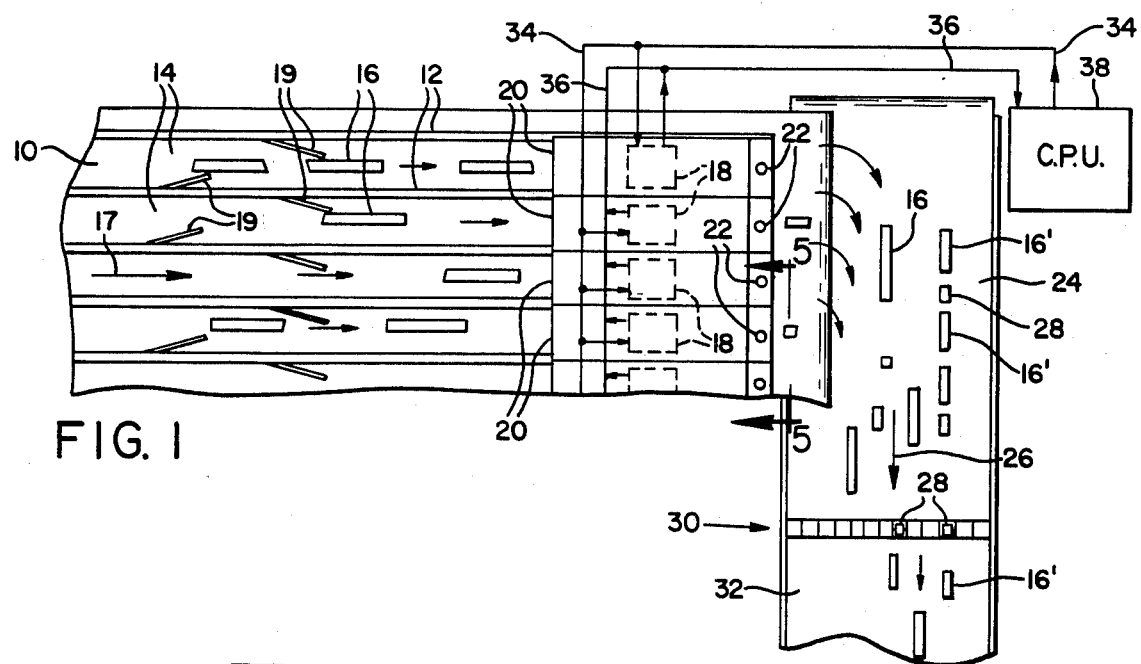
FIG. 1
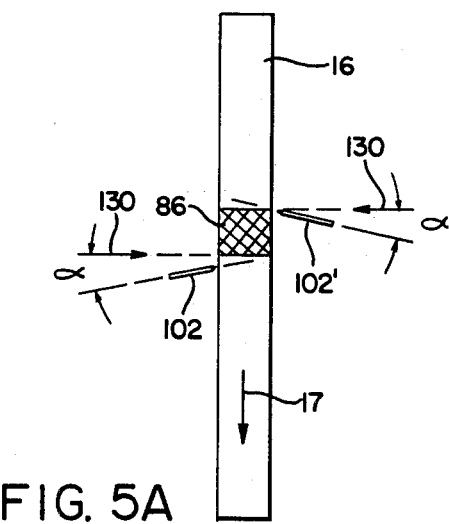
FIG. 5A
FIG. 2
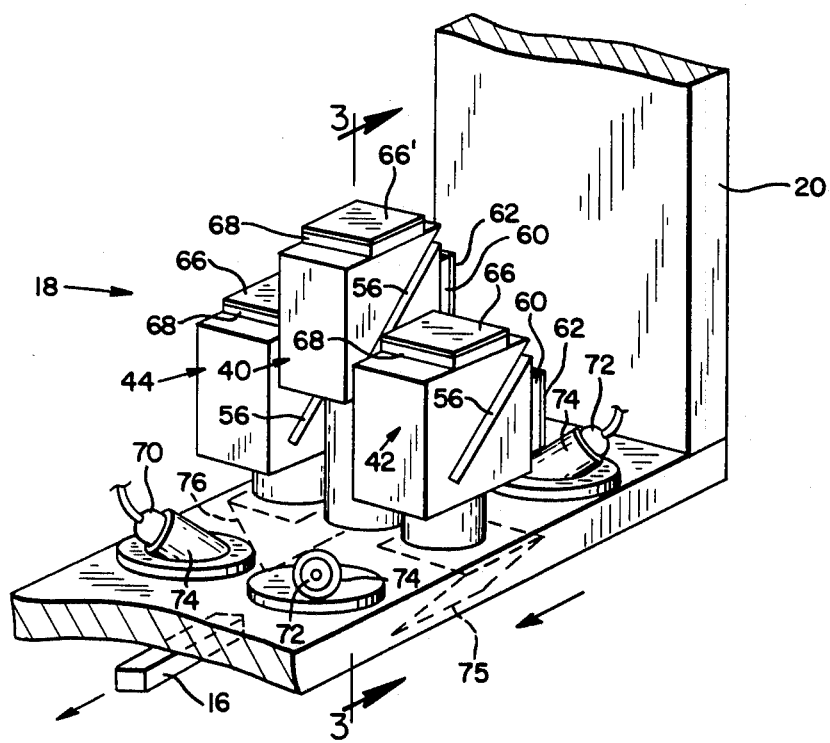

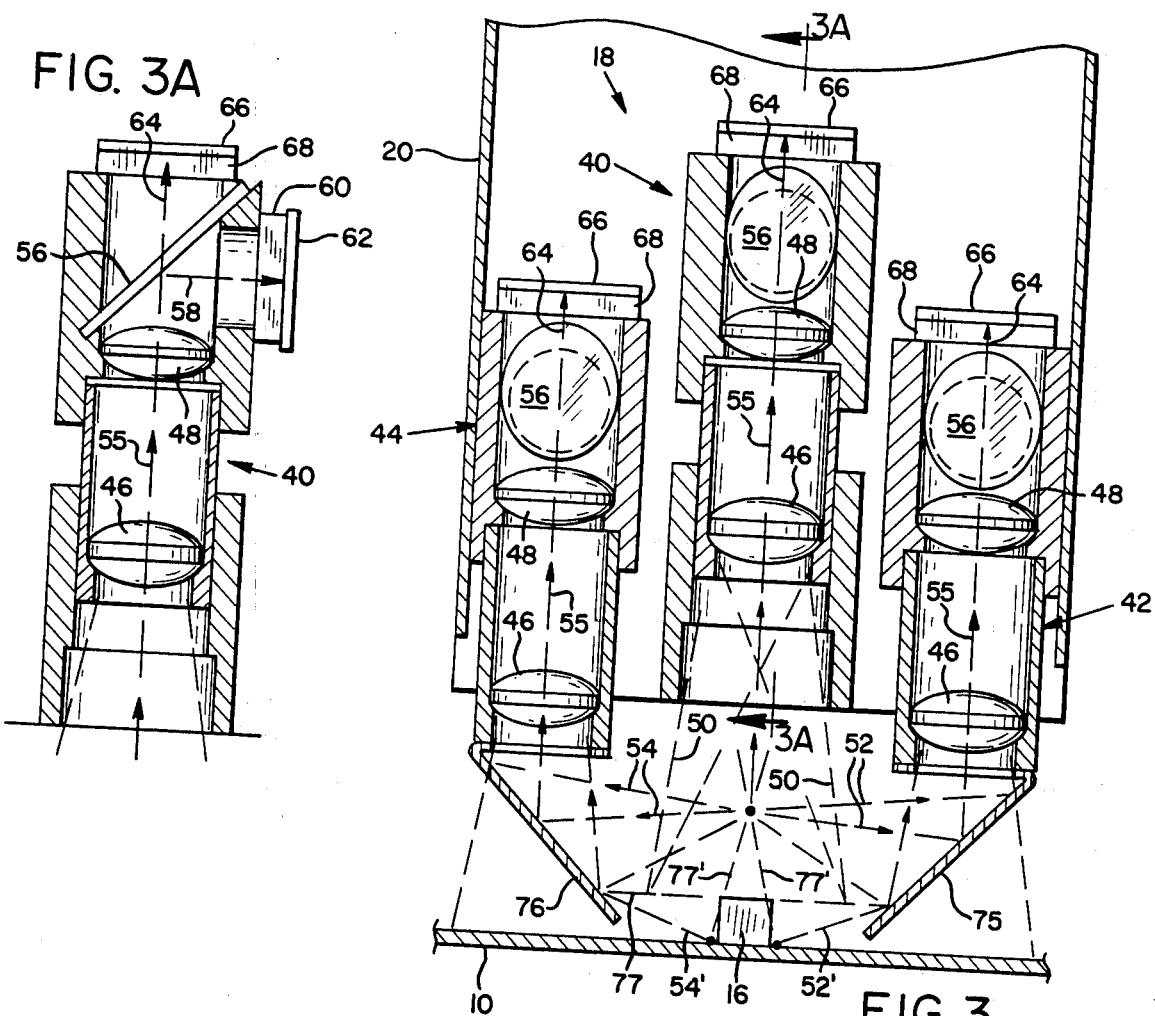
FIG. 3A
FIG. 3
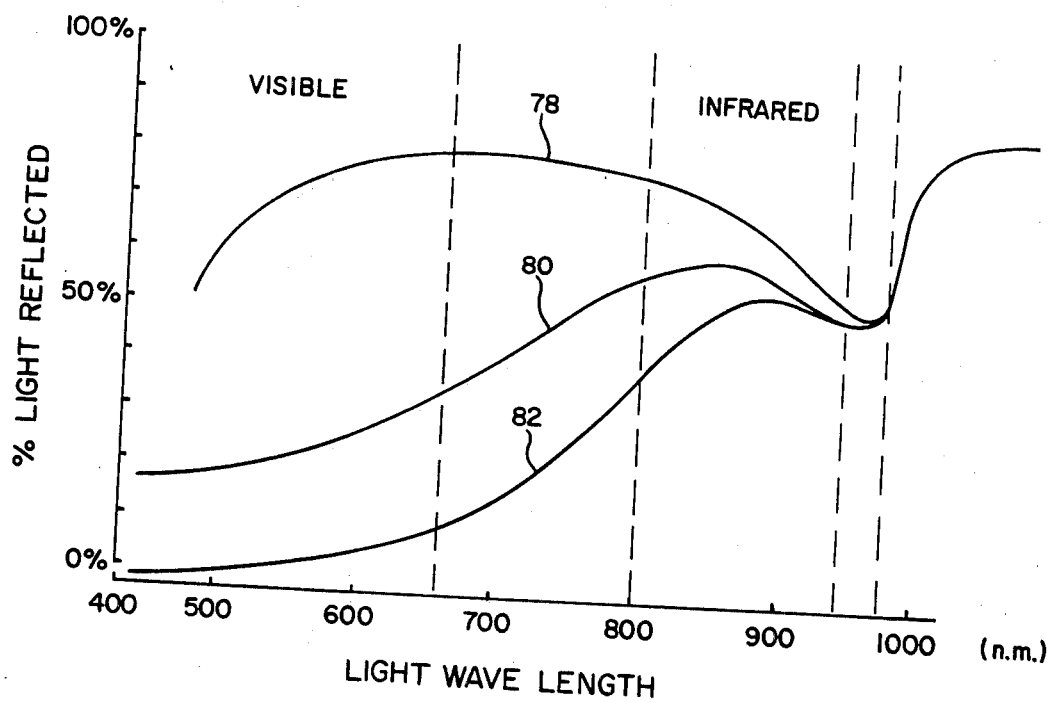
FIG. 4A

FOOD PRODUCT DEFECT SENSOR AND TRIMMER APPARATUS

REFERENCE TO MICROFICHE APPENDIX

A microfiche appendix of the computer program including 2 microfiche and 79 frames is filed herewith.

BACKGROUND OF THE INVENTION

The subject matter of the present invention relates generally to food product defect sensing and removal, and in particular, to food product defect sensing and trimmer apparatus and method which is capable of removing defects of different length at any position on the product without appreciable waste. The food product defect sensing and trimmer apparatus and method of the present invention is especially useful when employed to remove the defects from french fried potato strips, but is also suitable for use in the removal of defects from other elongated food products such as green beans and the like.

Previously, it has been proposed in U.S. Pat. No. 3,382,975 of Hoover issued May 14, 1968 to provide a food product defect sensing and sorting apparatus using a plurality of light sensors surrounding a transparent tube through which the food product is conveyed by water, to detect the defective products which are sorted out by ejecting them from the stream with an air jet deflector. Unlike the present invention, there is no cutter for cutting the defects out of the potato strips or other elongated food products in response to the sensing of such defects by the light detectors.

U.S. Pat. Nos. 4,147,619 and 4,186,836 of Wassmer et al issued Apr. 3, 1979 and Feb. 5, 1980, respectively, show similar apparatus for sensing defects in potatoes by means of light detectors and sorting out the defective potatoes without trimming or cutting out the defects. Wassmer et al U.S. Pat. No. 4,147,619 shows an apparatus for sensing defects in peeled potatoes and sorting out defective potatoes when the number of defects exceeds a predetermined minimum. The sensors are light reflection sensors in the form of self-scan diode array cameras which are spaced about a transparent tube through which the potatoes fall. The defective potatoes are sorted out by air-jets which reject them from the main stream of potatoes. However, there is no cutter for removing the defects and no data processor which determines the length of the food products and the position of a defect on the product as well as the size of the defect in the manner of the present invention.

Wassmer et al U.S. Pat. No. 4,186,836 discloses apparatus for sensing and sorting indiscriminately or randomly mixed food products, such as hash brown potato pieces, by selectively ejecting defective products through suction tubes. The sensing means radiates the top of the potato pieces with visible light and infrared light, which are detected by the same camera containing dual arrays of light detection diodes. U.S. Pat. No. 4,385,700 of Hodges et al issued May 31, 1983 shows a similar defect scanning and sorting apparatus for french fried potato strips. Thus, unlike the present invention, the light is not caused to be reflected off both sides and the top surface of a french fried potato strip or other elongated food product to three pairs of detectors to detect defects as such product is transmitted through separate channels on the conveyor. There is no ratio of the visible light to infrared light signals formed to provide defect recognition. Also, there is no cutter means for each channel which is controlled by the output signal of the sensor means to remove the defects by cutting them out of the food product.

It has also been proposed in U.S. Pat. No. 4,114,488 of Vornfett issued Sept. 19, 1978 to provide an elongated food product defect sensing and trimming apparatus including a cutter having a pair of knife blades supported so that such blades are separated by a fixed spacing. The knife blades are moved downward together to cut the potato strip or other food product while such product is being conveyed through a V-shaped feeder trough or channel. However, this cutter has the disadvantage that it is not capable of changing the space between the two knife blades to cut defects of a different length without appreciable waste. Thus, unlike the present invention, such cutter does not employ a single pivoted knife for making two or more cuts through the potato strip at variable spacings in order to accommodate defects of a different length. Furthermore, the nature of the light sensor used to detect the defects is not disclosed. Thus, the sensor appears to be a conventional visible light detector means in the form of a plurality of photocells positioned above the conveyor troughs or channels which scan the potato strips conveyed through such channels. In addition, there is no teaching of the use of a data processor circuit for determining the length of the potato strip, the position of the defect on the potato strip and the size of the defect. Finally, there is no disclosure of removing the defect with a minimum of waste by adjusting the spacing distance between two cuts of a single knife blade which is pivoted back and forth across the path of the potato strip to cut off defects of different length, in the manner of the present invention.

It has previously been proposed by Kroenig in U.S. Pat. Nos. 4,251,555 and 4,351,232 issued Feb. 17, 1981 and Feb. 28, 1982, respectively, to provide a method and apparatus for sensing defects in potato strips and trimming the ends of the defective strips with a rotating cutter to remove defects, thereafter again sensing and sorting the trimmed strips to make sure that all the defect has been removed. However, unlike the present invention, the sensor is a visible light sensor which scans the potato strips as they fall through a transparent tube surrounded by the light source and detectors. Also, the cutter employs a rotating cutter blade which is only capable of making one cut per potato strip to remove the defects on the ends of such strip. Thus, unlike the present invention, the cutter is not capable of making two or more cuts per strip and cannot vary the spacing between the two cuts to remove defects of different length. As a result, there is much wastage when using the apparatus of Kroenig and it requires a longer time to remove the defects.

SUMMARY OF INVENTION

It is therefore one object of the present invention to provide an improved apparatus and method for sensing defects in elongated food products and for cutting out such defects with a minimum of waste.

Another object of the invention is to provide such an apparatus and method in which the length of the food product and any defect therein are sensed by a light sensor means and the position of the defect on the product and the size of the defect are determined automatically by a data processor circuit in response to the output data signals of the sensing means to produce cutter signals which control a cutter means for removal of the defect in an accurate and efficient manner.

A further object of the invention is to provide such an apparatus in which the cutter means for removing the defect is capable of making two or more cuts per food product and of varying the spacing distance between the cuts to remove defects of different lengths.

An additional object of the invention is to provide such an apparatus in which the cutter means is operated in a fast, efficient and trouble-free manner by pivoting a single knife blade back and forth across the elongated food product to cut the product in both directions of pivoting as such product is conveyed past the cutter without appreciably slowing the conveying speed of the product.

Still another object of the invention is to provide an improved cutter apparatus of fast and accurate operation which is controlled by a cylinder means that it is operated by a spool valve in response to the actuation of two solenoid valves connected to the opposite ends of the spool valve in response to cutting signals applied to the solenoid valves by the data processor.

A still further object of the invention is to provide an improved light sensor means for more accurately detecting defects in elongated food products such as french fried potato strips by reflecting visible light and infrared light off the top and two sides of such strips to three separate detector means, each including a pair of detectors, which produce output signals corresponding to the reflected visible light and infrared light that are compared to determine whether a defect is present as well as to locate the position of the defect with respect to the opposite ends of the strip.

DESCRIPTION OF DRAWINGS

Other objects and advantages of the present invention will be apparent from the following detailed description of a preferred embodiment thereof and from the attached drawings of which:

FIG. 1 is a top plan view of a food product defect sensing and trimmer apparatus made in accordance with the present invention;

FIG. 2 is a perspective view of a light sensor employed in the apparatus of FIG. 1 with the sides of the scanner housing removed;

FIG. 3 is a vertical section view taken along the line 3—3 of FIG. 2;

FIG. 3A is a vertical section view taken along the line 3A—3A of FIG. 3;

FIG. 4A is a graph of the percentage of reflected light vs. wavelength of such light which is reflected from potato strips with and without defects;

FIG. 5A is an enlarged horizontal section view taken along the line 5A—5A of FIG. 5;

DESCRIPTION OF PREFERRED EMBODIMENT

Figure 4B:
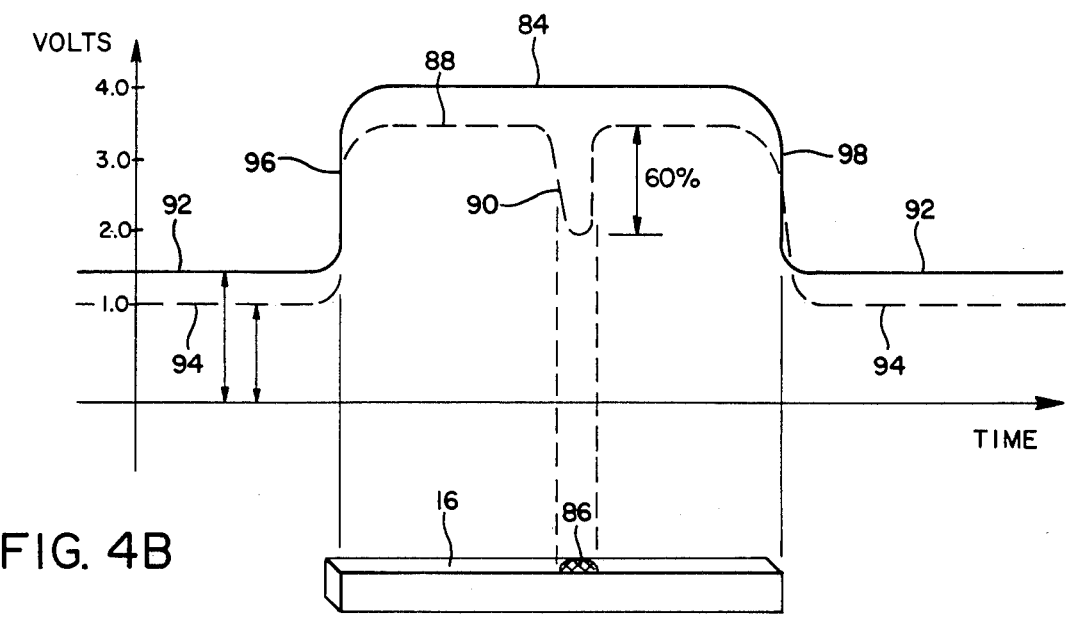
FIG. 4B is a diagram of the electrical signals produced by the visible light and infrared light detectors employed in the sensor of FIGS. 2 and 3 when a defect is detected.

As shown in FIG. 1, a food product defect sensor and trimmer appartus in accordance with the present invention includes an infeed conveyor 10 which may be a rotating conveyor belt moving at a constant speed of about 60 inches per second. A plurality of longitudinal partitions 12 are mounted in uniformly spaced relationship across the conveyor belt to provide sixteen channels 14, each about two inches wide, between such partitions. Elongated food products 16, such as french fried potato strips, are conveyed longitudinally through channels 14 along a conveying direction 17 in contact with such conveyor belt in single file, spaced apart and with their longitudinal axes substantially parallel to such conveying direction. The potato strips 16 are centered in the channels 14 by engagement with centering guide members 19 extending from the sides of the partitions 12 across about one-third of the channel width. While the invention will be described with reference to detecting blemishes and other defects in a french fried potato strip 16, it should be understood that other elongated food products such as green beans and the like may also be sensed and trimmed in such apparatus. Sixteen light sensors 18 are supported in housings 20 over the conveyor belt 10 at positions in alignment with the infeed channels 14. Each of the light sensor housings 20 contains one light sensor means 18 and its associated data processor system shown in FIG. 8. The data processor system hereafter described receives data input signals from the light detectors in the sensor means 18 and produces output cutter control signals which are used to actuate a cutter means 22 pivotally attached to the rear end of each housing 20.

The cutter means 22 associated with each channel 14 cuts defects out of the french fried potato strips 16 transmitted through such channel when such defects are sensed by the light sensor 18. The resulting trimmed potato strips 16' are discharged from the conveyor belt 10 onto an outfeed conveyor belt 24 which conveys such trimmed strips in the direction of arrow 26 substantially perpendicular to the conveying direction 17 of the conveyor belt 10. The trimmed defects 28 cut from the potato strips 16 are, also, conveyed by the outfeed conveyor 24 and are sorted out by dropping such trimmings through a narrow slot 30 between the outfeed conveyor 24 and a discharge conveyor 32. Alternatively, removal of the trimmings can be done on a vibration conveyor 32 by allowing defects 28 and other short trimmings to fall through slots in such conveyor.

The data processor circuits in each of the housings 20 are connected by two pair of common conductors 34 and 36 to a central processing unit (C.P.U.) or computer 38 which may be a general purpose digital computer, such as an Apple II Plus computer made by Apple Computer, Inc. of Cupertino, California. The computer 38 sends a polling signal over conductor pair 34 from the output of such computer to the address identification inputs of the data processors in each of the housings 20, which are provided with different digital identification codes in their binary coded identification address circuits. The selected data processor having the identification code used in the polling signal then transmits the data stored therein over conductor pair 36 back to the data input of the computer 38 and thereafter clears the memory of such selected data processor once the data has been transferred. The data transfered may include such information as the average length of the french fried strips, the number of french fries counted and the number of defects detected, as well as other stored information, which may be displayed upon the monitor of the central computer 38, or may be printed out.

As shown in FIGS. 2 and 3, each of the light sensors 18 contained within the housings 20 includes three reflected light detector assemblies 40, 42 and 44 positioned in a row across the width of the channel 14. The detector assemblies 40, 42 and 44 detect light reflected, respectively, from the top surface, right side and left side of the french fried potato strip 16 as such potato strip is being conveyed longitudinally on conveyor belt 10 in the conveying direction 17 beneath the light sensor 18. Each of the light detector assemblies 40, 42 and 44 includes a pair of axially aligned lenses 46 and 48 which focus light reflected from the potato strip 16 onto light detectors. Thus, light beams 50, 52 and 54 are reflected from the top surface, the right side and the left side, respectively, of the french fried potato strip 16 into the detector assemblies 40, 42 and 44, respectively, through the lenses 46 and 48 along a primary ray axis 55 to a dichroic beam splitting mirror 56 mounted at an angle of 45° with respect to such axis in each of the detector assemblies. As shown in FIG. 3A, the beam splitting mirror reflects an infrared beam along a first path 58 to an infrared light detector 62 through a filter 60 which only passes infrared light and filters out visible light. The remaining visible light beam is transmitted through the beam splitting mirror 56 along a second path 64 to a visible light detector 66 through a filter 68 which passes only visible light and filters out infrared light. As hereafter described with respect to FIG. 4A, the visible light band pass filter 68 transmits only visible light preferably in a wavelength range below 650 nanometers, while the infrared band pass filter 60 passes only infrared light preferably in a wavelength range above 800 nanometers. For example, the visible light band pass filter 68 may pass light in the wavelength range of 400 to 630 nanometers, while the infrared band pass filter may pass light in the wavelength range of 850 to 1000 nanometers. The detectors 62 and 60 may be PN junction silicon photocells, such as the Vactec VTS 3080 type photovoltaic detector having dimensions of 0.8 by 0.8 inch which is manufactured by Vactec, Inc of St. Louis, Missouri. The lenses 46 and 48 are aspheric lenses, respectively, of 19 mm diameter, 20 mm focal length and of 18 mm diameter and 15 mm focal length.

The two pairs of light sources 70 and 72 are positioned in front and behind the row of detector assemblies 40, 42 and 44 and illuminate the the front end and the rear end of the french fried potato strip 16. Light source 70 also illuminates the top and left side of the french fried potato strip while the light source 72 illuminates a top and right side of such strip. Each of the light sources emits both visible light and infrared light and may be a krypton gas filled lamp. The light source is mounted within a housing 74 inclined forward or rearward at an 45° angle with respect to the bottom of the sensor housing 20 and to the upper surface of the conveyor belt 10. In addition, the light sources 70 and 72 are directed inward at an angle of approximately 45° with respect to the center of the conveyor belt 10 so that the exposed surface of the french fried potato strip is uniformly and completely illuminated. A pair of mirrors 75 and 76 are mounted beneath the detector assemblies 42 and 44 and extend at an angle of approximately 45° with respect to the primary ray axis 55 in order to reflect light from the right side and left side, respectively, of the french fried potato strip 16 into the entrance lens 46 of each of such detector assemblies. It should be noted that the channel partitions 12 merge into alignment with the mirrors 75 and 76 to narrow the channel 14 at a location beneath the sensor 18 where such channel has a width of approximately 2 inches. It should be noted that the viewing field of the middle detector assembly 40 in the focal plane 77 parallel to and adjacent to the top surface of the french fried potato strip 16 has an area of approximately 0.063 by 1.5 inches. However, since the cross-section of the french fried potato strip 16 is normally ⅜ inch square, the 1.5 inch wide viewing field of lens 46 of the top detector assembly 40 will intercept the top surface of the french fried potato strip even though it may not be centered in the channel. Also, the side detector assemblies 42 and 44 have folded optical paths between the entrance lens 46 and their focal planes 77' due to the presence of mirrors 75 and 76. The focal planes 77' of detector assemblies 42 and 44 are adjacent and almost parallel to the right side and the left side, respectively, of the potato strip 16 when it is centered on the axis 55 of the middle detector assembly 40.

As shown in FIG. 4A, the light characteristic 78 of light reflected from a white potato strip having no blemishes or defects is substantially the same in the visible light range below 650 nanometers as it is in the near infrared light range above 800 nanometers. However, the reflected light characteristic 80 of a brown blemish spot or a brown skin portion on a defective potato strip greatly reduces the reflected light in the visible light range while it only slightly reduces the reflected light in the infrared light range. For example, at 650 nanometers wavelength, the visible light reflected is about eighty percent on light characterisic curve 78 while it is only about thirty-five percent on the light characteristic curve 80. However, at a wavelength of 800 nanometers, about seventy-five percent of the infrared light is reflected on the characteristic curve 78, while about fifty-five percent is reflected on characteristic curve 80. Thus, there is a much greater attenuation of the reflected light in the visible light band below 650 nanometers than there is in the infrared light band above 800 nanometers when the potato strip contains a brown blemish or brown skin defect. Light characteristics curve 82 for light reflected from a black rot defect on the potato strip shows even greater attenuation of the visible light at 650 nanometers where only about ten percent of the light is reflected. However, in the infrared region of curve 82 at 800 nanometers, approximately forty percent of the light is reflected by the black rot defect. Also, for clear white potato strips the ratio of visible light divided by infrared light reflected from the potato strip is substantially constant regardless of the intensity of the reflected light. However, such ratio greatly decreases when a defect is detected.

This difference in the percent of light which is reflected from clear white potato strips and from brown or black defects in such potato strips, also, results in changes in the voltage of the output signal produced by the light detectors 62 and 66 as shown in FIG. 4B. Thus, the voltage amplitude of a infrared light signal 84 produced by the infrared detector 62 remains substantially constant at about +4.0 volts along the length of the potato strip 16 even when a defect 86 is detected. However, the amplitude of the visible light signal 88 produced by the detector 66 reduces markedly from its maximum value of about +3.4 volts to a lower value of about +1.7 volts or up to sixty percent amplitude reduction for the region 90 of such signal corresponding to when a defect 86 is sensed by such visible light detector 66. It should be noted that the visible light signal 88 and the infrared light signal 84 both have quiescent off-set voltages 94 and 92, respectively, greater than zero volts of about +1.0 and +1.3 volts when no potato strip is detected. These signals both increase at a leading edge 96 from such quiescent voltages to their maximum amplitude voltage levels when the front end of the potato strip 16 is detected. Similarly, the infrared light signal 84 and the visible light signal 88 reduce quickly at a trailing edge 98 from their maximum amplitude voltages to such quiescent values 92 and 94, respectively, when the rear end of the potato strip is detected. Thus, the distance between the leading edge 96 and the trailing edge 98 of the signals 84 and 88 indicates the length of the potato strip 16 which has been detected. In addition, the maximum width of the reduced amplitude portion 90 of the visible light signal 88 indicates the length of the defect portion 86 on the surface of the french fried potato strip. Also, the location of the defect portion 86 relative to the front end of the french fried potato strip 16 is indicated by the distance that the reduced amplitude portion 90 of signal 88 is spaced from the leading edge 96 of such signal. Thus, the data contained in the visible light signal 88 and the infrared signal 84 can be used by a data processor connected to the detectors 62 and 66 of the sensor 18, such as the data processor system of FIG. 8, to determine these characteristics and to control the cutting means 22 in order to remove the defective portion 86 of the potato strip.

Figure 5:
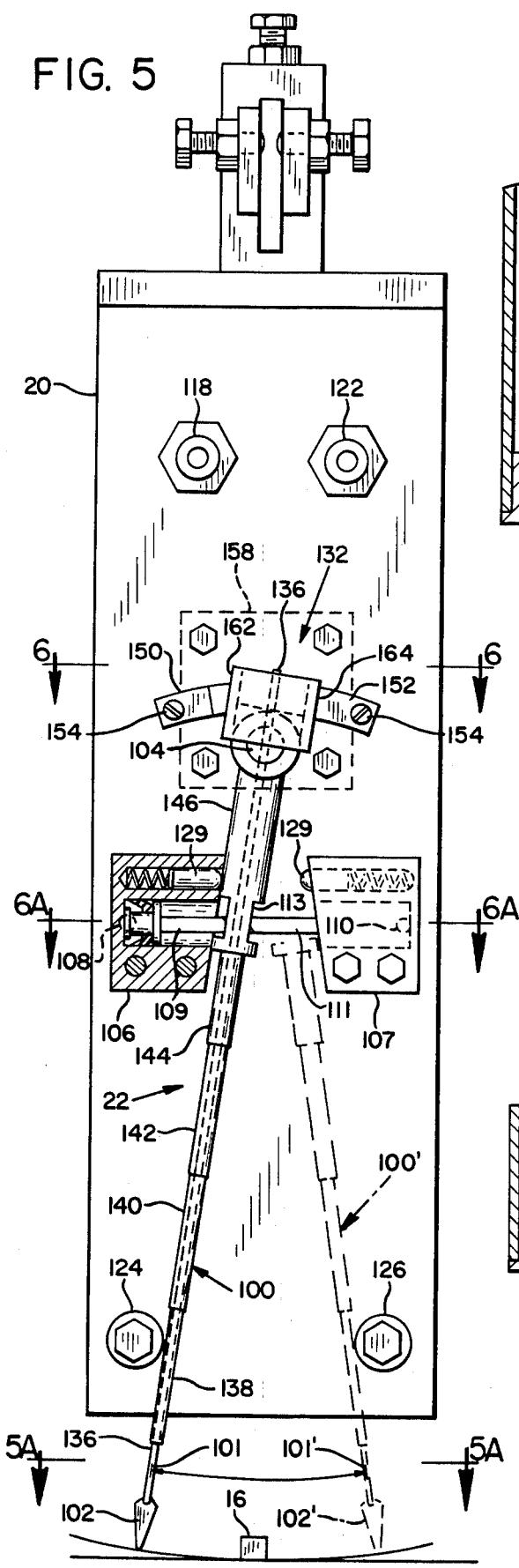
FIG. 5 is a rear elevation view of the cutter apparatus taken along line 5—5 of FIG. 1.

As shown in FIG. 5, the cutter means 22 includes a tapered support arm 100 having a knife blade 102 attached to the bottom end thereof and pivotally mounted at its top end on a pivot shaft 104 attached to the rear end of the sensor housing 20. The cutter support arm 100 is pivoted back and forth about pivot shaft 104 by a pair of air cylinders 106 and 107. The two pistons of cylinders 106 and 107 have their piston rods 109 and 111 connected together and coupled to the cutter support arm 100 at a groove 113 for pivotal movement of such support shaft. In addition, an inner knife rod 136 portion of the support arm 100 is rotated about its longitudinal axis 101 through a small angle as hereafter described with respect to FIGS. 5A and 6.

Figure 7:
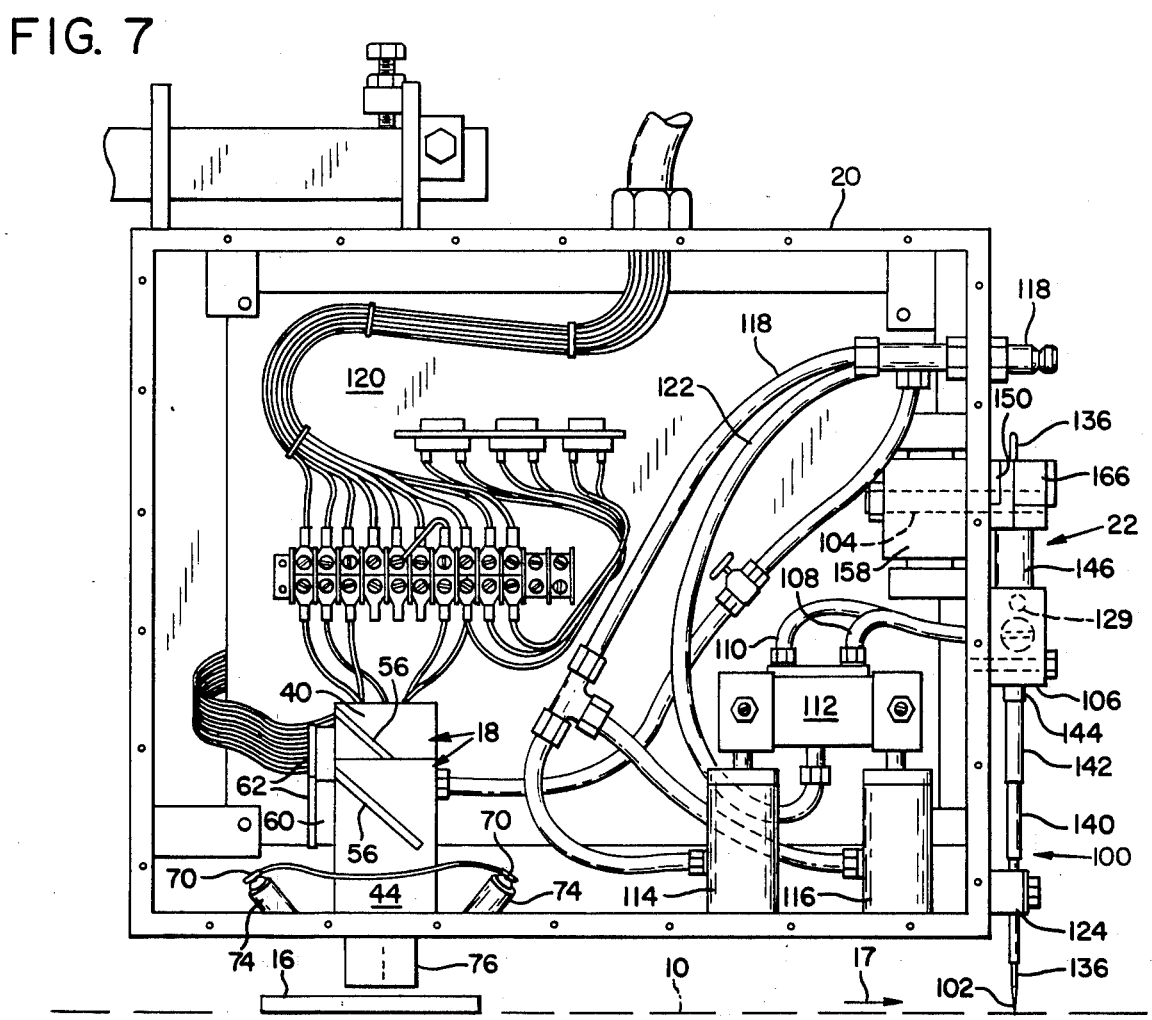
FIG. 7 is a side elevation view of a light sensor and data processor housing with the side of the housing removed for clarity.

The cylinders 106 and 107 are connected by lines 108 and 110, respectively, to a spool valve 112 positioned within the housing 20 as shown in FIG. 7. The spool valve is controlled by a pair of pilot valves 114 and 116 connected to the opposite ends of such spool valve. The pilot valves are preferably high-speed solenoid valves 114 and 116 which are both coupled to an air supply line 118 connected to a source of pressurized air on the order of about 80 psi pressure. The solenoid valves 114 and 116 are selectively actuated by electrical cutting signals produced by a data processor circuit mounted on a circuit board 120 contained within housing 20 and connected to the light detectors of the sensor means 18. The air outlets of the solenoid valves 114 and 116 are connected to the opposite ends of the spool valve 112 to cause the movable spool valve member to slide longitudinally back and forth between two valve positions. In one spool valve position, the spool valve supplies pressurized air to cylinder 106 through line 108 which causes the cutter arm 100 to pivot in a counter clockwise direction. In the other position of the spool valve 112, such valve supplies pressurized air through line 110 to cylinder 107 thereby causing the cutter arm 100 to rotate in a clockwise direction. Highly pressurized air at about 120 psi is supplied to the spool valve through an air supply line 122 having a connector attached to the rear end of the housing 20. This high pressure air causes the cylinders 106 and 107 to rotate the cutter arm 100 very rapidly so that it can pivot up to one hundred times per second.

Pivoting movement of the cutter support arm 100 about pivot 104 is limited by a pair of cushioned stops 124 and 126 fastened to the rear end of the housing 20 adjacent the bottom thereof. In addition, a spring biased bumper 129 may be provided on the housing of each cylinder 106 and 107 in position to engage the support shaft 100 to absorb the shock of such shaft when it strikes the cylinder. As a result of the operating cylinders 106 and 107, the cutter support arm 100 is reciprocated back and forth across the width of the channel 14 with a transit time of about 8 milliseconds to rapidly cut the french fried potato strips 16 as such strips are transmitted longitudinally through the channel after such strips move past the sensor means 18 secured to the bottom of housing 20. The knife blade 102 has two cutting edges on the opposite sides thereof so that it will cut in both directions and is capable of cutting each potato strip twice each time the cutter support shaft 100 is pivoted back and forth between the stops 124 and 126 by the cylinders 106 and 107. This enables a defect in the middle of the potato strip, such as shown in FIG. 4B as defect 86, to be cut out and removed from the potato strip without wasting the ends of the strip when such ends are free of defects. Also, it enables the distance between the two cuts to be varied in order to remove defects of different length, such length variations being measured by the visible light detectors sensing the reduced amplitude portion 90 of the visible light signal 88 of FIG. 4B.

Figure 6:
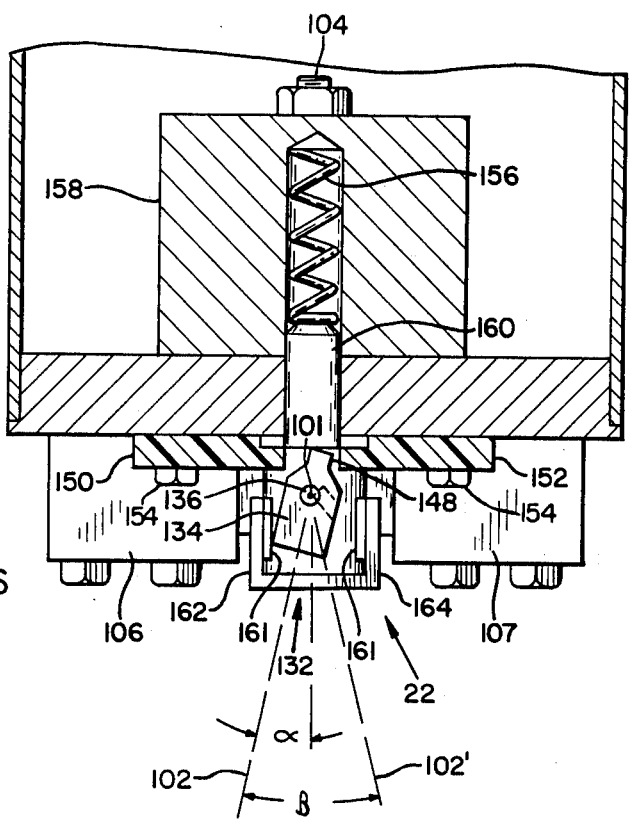
FIG. 6 is an enlarged horizontal section view taken along the line 6—6 of FIG. 5 with the cutter support arm centered.

As shown in FIG. 5A, the knife blade 102 strikes the potato strip 16 at an acute angle directed upstream of the direction of movement 17 of such strip. The blade 102 forms an angle $\alpha$ with a transverse plane 130 corresponding to the direction of movement of the cutter which is perpendicular to the direction of travel 17 of such potato strip on the conveyor belt 10, and in most cases, to the longitudinal axis of the potato strip. The angle $\alpha$ is less than 45° and is preferably in the range of about 5° to 30° depending on the relative speed of the blade and potato strip with the optimum angle being approximately 14° for cutting a french fried potato strip in two at a knife blade speed of about 240 inches per second. This angle $\alpha$ enables the defective portion 86 to be cut from the moving potato strip without materially slowing down the strip on the conveyor belt and with greater accuracy to reduce waste. After the first cut adjacent the front end of the defect 86 by one knife edge, the knife blade 102 is also rotated through an angle $\beta = 2\alpha$ about the longitudinal axis 101 of the shaft 100 into a second cutting position 102' shown in FIGS. 5A and 6 so that its other knife edge strikes the potato strip 16 at approximately the same acute angle $\alpha$. Thus, blade 102' forms an acute angle $\alpha$ with the transverse plane of cutter movement 130 perpendicular to the direction of travel 17 of the conveyor belt. After the second cut is made by the knife blade moving from position 102' across the path of the potato strip, the knife rod 136 is rotated back through an angle $\beta = 2\alpha$ about its longitudinal axis to again locate the knife blade in position 102 of FIG. 5A. This pivoting of the knife rod 136 about its longitudinal axis 101 is accomplished by a toggle mechanism 132 mounted on the rear end of the housing 20 adjacent the top of such support shaft as shown in FIGS. 5 and 6.

Figure 6A:
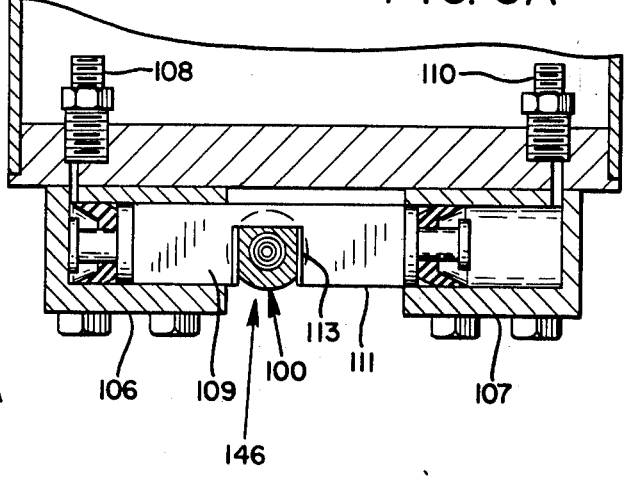
FIG. 6A is an enlarged horizontal section view taken along the line 6A—6A of FIG. 5.

The toggle mechanism 132 includes a toggle member 134 which is secured to the top end of a knife rod 136 extending through a passage in the pivot shaft 104 and through an inner tubular member 138 to the knife blade 102. The blade 102 is attached to the bottom end of the knife rod 136 and may be formed integral therewith. The inner tube 138 is surrounded by three other tubular members 140, 142 and 144 of progressively greater diameter and shorter length for stiffening purposes, and together with the knife rod 136 they form the cutter support arm 100. The knife blade 102 is fastened to the bottom end of the knife rod 136 so that rotation of such rod about the longitudinal axis 101 of the support arm 100 by the toggle member 134 pivots the blade 102 through angle $\beta = 2\alpha$ between the two cutting positions 102 and 102' shown in FIG. 5A. Thus, the knife rod 136 not only forms part of the support arm 100 for rotation about the axis of the pivot shaft 104 during pivotal movement by the cylinders 106 and 107, but also couples the knife blade 102 to the toggle member 134 for pivoting such knife blade about the longitudinal axis 101 of arm 100. A tubular pivot connection member 146 is provided at the upper end of the support arm 100 surrounding the tubular member 144 and connected to the pivot shaft 104. The notch 113 in the support arm 100 which is engaged by the piston rods 109 and 111 of the cylinders 106 and 107 is provided at the lower end of the pivot connection member 146, as shown in FIGS. 5 and 6A.

The toggle member 134 is keyed to the knife shaft 136 for rotation of such knife shaft about the longitudinal axis 101 of the cutter support shaft 100 when a cam follower projection 148 provided on the toggle member engages the inner end of one of a pair of cam members 150 and 152 made of a suitable synthetic plastic material such as nylon or high-density polyethylene. The cam members 150 and 152 are fastened by bolts 154 to the rear end of the housing 20 so that their inner ends are spaced apart on opposite sides of the axis of the pivot shaft 104 at a position slightly above such pivot shaft. A toggle spring 156 is provided within a passageway in the face of a bearing block 158 mounted on the inner surface of the rear end of the housing 20. The toggle spring urges a toggle biasing member 160 into engagement with the cam follower projection 148 on the toggle member 134 to hold such toggle member in one of two toggle positions corresponding to the knife positions 102 and 102' of FIGS. 5A and 6. The outer end of the toggle biasing member 160 provides a bearing surface across which the cam follower projection 148 slides when the toggle member 134 is moved by the cam members 150 and 152 between the two cutting positions of the knife blade 102 shown in FIGS. 5A and 6. The pivotal movement of the toggle member 134 and the associated knife rod 136 is limited by stops 161 provided on a pair of stop support members 162 and 164 positioned on opposite sides of the toggle member and attached to the upper end of the pivot member 146. The spacing between the stops 161 on stop members 162 and 164 and their position relative to the axis of the knife rod 136 about which the toggle member 134 pivots, determines the limits of rotation angle $\beta$ through which the toggle member pivots the knife blade. Angle $\beta$ is equal to twice angle $\alpha$, and is preferably set at 28° for an angle $\alpha$ of 14° as shown in FIGS. 5A and 6.

Data Processor System

Figure 8:
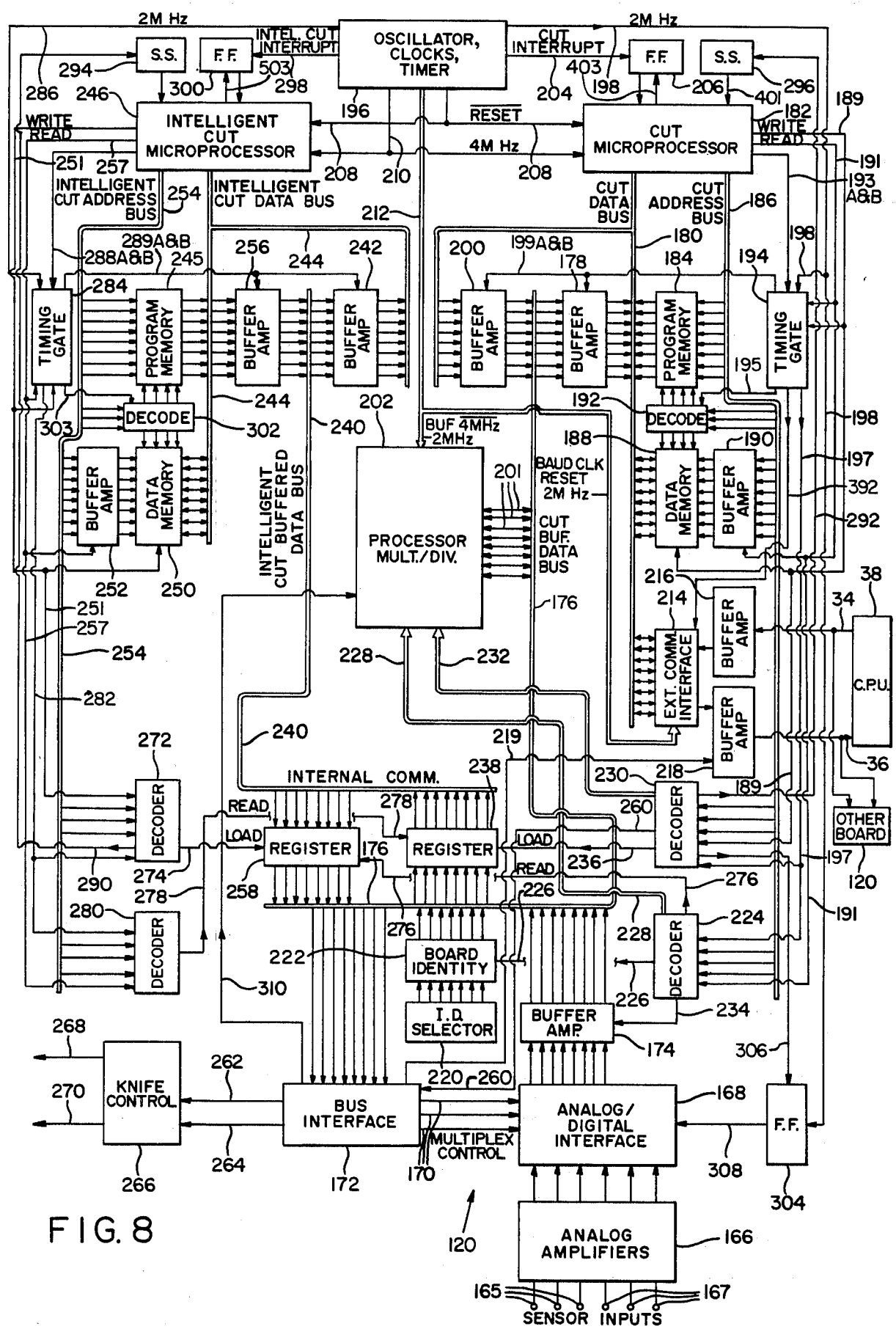
FIG. 8 is a schematic block diagram of the electrical data processor system contained in each of the scanner housings used in the apparatus of FIG. 1.
Figure 9:
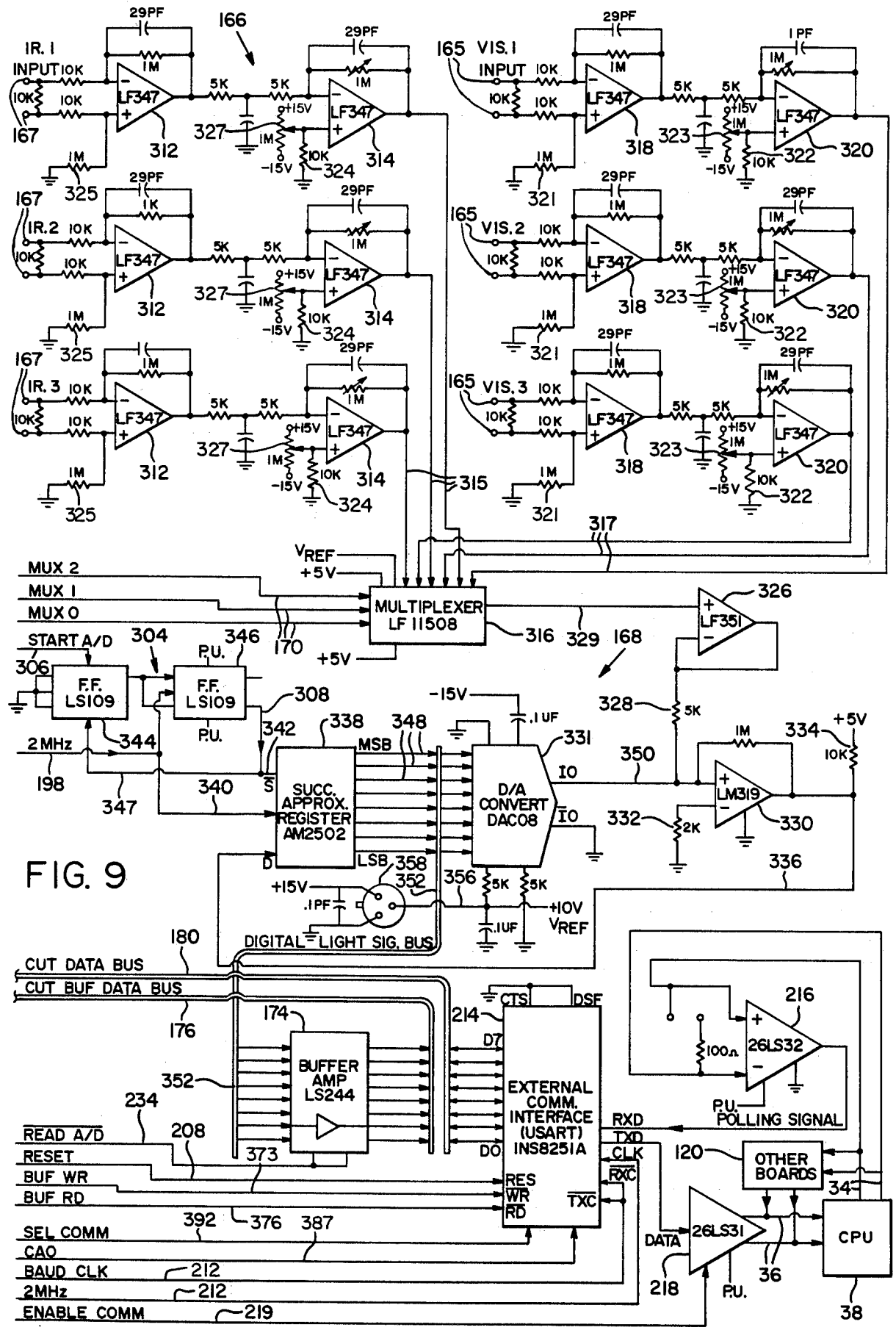
FIGS. 9, 10, 11, 12, 13 and 14 are electrical circuit diagrams of the data processor system of FIG. 8.

As shown in FIG. 8, the data processor system provided on the electrical circuit board 120 within each of the housings 20 includes an analog amplifier circuit 166 having six sensor signal inputs including three visible light signal inputs 165 connected to the three visible light detectors 66 and three infrared light signal inputs 167 connected to the three infrared light detectors 62 of the light sensor 18. Each of the inputs 165 and 167 includes a pair of input terminals as shown in FIG. 9. The analog amplifier circuit 166 amplifies and shapes the reflected light signals produced by the light detectors and applies them to six analog inputs of an analog-to-digital interface circuit 168, where such analog light signals are converted to eight bit binary coded digital light signals at the eight output terminals of such interface. The analog-to-digital interface circuit 168 includes a multiplexer switching means which is controlled by three multiplex control signals which are applied at three control inputs 170 by a bus interface circuit 172 to cause such analog-to-digital interface to produce an eight bit binary coded digital light signal for each analog light signal. A buffer amplifier 174 amplifies the current and shapes the digital light signal produced by the interface 168 and applies it at eight parallel output terminals to a cut buffered data bus 176 when such buffer amplifier is switched on by a read signal at input 234. The buffered data bus 176 includes a plurality of parallel conductors which conduct the digital light signal through another buffer amplifier 178 to a cut data bus 180, also including a plurality of parallel conductors which is connected to a cut microprocessor 182.

The cut microprocessor 182 is a general purpose digital computer, such as a Z80 microprocessor designed by Zilog, Inc. of Campbell, California. The microprocessor 182 processes the digital light signals to determine when a french fried potato strip is sensed and the length of the potato strip by detecting light reflected from the opposite ends of such potato strip and determines whether the potato strip has any surface color variations which might be defects that should be removed by cutting such strip. The cut microprocessor 182 operates in accordance with a computer program stored in a program memory 184 connected at eight outputs to the cut data bus 180 which transmit the program steps to the microprocessor 182. The program memory 184 may be an eight kilobyte programmable read only memory or PROM, and is also connected by eight inputs to a cut address bus 186 including a plurality of parallel conductors which are connected to the cut microprocessor 182. Thus, the program memory 184 is addressed by address signals produced by the microprocessor and transmitted over the address bus 186. The digital reflected light data concerning the presence of a potato strip, the length of the potato strip, the presence of any defect, and the position of the defect relative to the opposite ends of such potato strip is stored in a data memory 188 having eight lines connected to the cut data bus 180 and having its eight address inputs connected through a buffer amplifier 190 to the cut address bus 186. The data memory 188 may be an eight kilobyte random access memory or RAM. The data memory 188 and the program memory 184 are each connected by four lines to a decoder circuit 192 which is also connected by three lines to the cut address bus 186 for operating such memories. A write signal output 189 of the microprocessor 182 is applied to the data memory 188 for writing data into such data memory. A read signal output 191 of the microprocessor is applied to the buffer amplifier 190 to read data out of the memory when address information is transferred thereto through such amplifier.

A timing gate circuit 194 is provided with four inputs including write input 189, read input 191 and two timing inputs 193A and B connected to outputs of the cut microprocessor 182. One output 195 of the timing gate is connected to the decoder 192 which controls both memories 184 and 188. Another output 197 of the timing gate 194 is connected to the decoders 224 and 230 in order to time these circuits. Two megahertz clock pulses are applied to the timing gate 194 through input conductor 198 by an oscillator, clock and timer circuit 196. The timing gate 194 applies timing pulses at outputs 199A and B to the buffer amplifiers 178 and 200 in order to switch on the amplifiers and transmit data signals through such buffer amplifiers. Thus, input data signals are transmitted through amplifier 178 from the cut buffered data bus 176 to the cut data bus 180. Data signals are also transmitted through amplifier 200 from the cut data bus 180 to the cut buffered data bus 176 for application over eight lines 201 to a multiply and divide arithmetic unit 202. The arithmetic unit 202 produces a ratio signal of the visible light signal to the infrared light signal for each of the three pairs of detectors 66 and 62 in sensors 40, 42 and 44 of the sensor means 18, in a manner hereafter described with reference to FIG. 11. The ratio signals are transmitted from the arithmetic unit 202 through bus 176 to an intelligent cut microprocessor 246 in a manner hereafter described which determines whether the potato strip will be cut to remove a defect.

The oscillator, clock and timer circuit 196 produces a cut interrupt signal at output 204 which is applied to a bistable flip/flop circuit 206 connected to the cut microprocessor 182. The cut interrupt signal triggers the flip/flop 206 which interrupts data processing or other functions in the microprocessor 182 and synchronizes new data acquisition. After such interrupt signal is sensed by the microprocessor 182, it produces an interrupt acknowledge signal at output 403 which reverts the flip/flop to its initial quiescent state to enable further processing of data. The oscillator, clock and timer circuit 196 also produces a inverted reset pulse, reset, at output 208 which resets the cut microprocessor 182 to its initial zero state at the beginning of the computer program when the power is turned on. Additionally, the oscillator, clock and timer circuit 196 produces a four megahertz clock pulse signal at output 210 which is applied to the clock input of the cut microprocessor 182. Finally the oscillator, clock and timer circuit also produces, on output bus 212, a baud clock signal, a 2 MHz clock signal, a reset signal and a buffered $\overline{4\ MHz}$ signal. The 2 MHz clock signal and the buffered $\overline{4\ MHz}$ clock signal are applied to the multiply and divide circuit 202. The baud clock signal, the 2 MHz clock signal and the reset signal are applied to an external communications interface circuit 214.

The external communication interface circuit 214 is connected between the cut data bus 180 and the central processing unit 38 through a pair of buffer amplifiers 216 and 218. The C.P.U. 38 produces a polling signal at output terminal 34 which is transmitted through the buffer amplifier 216 to the input of the external communication interface 214 in order to poll the data stored in the data memory 188 when the identification code of such polling signal corresponds to that of the data processor system on one of the circuit boards 120. The identification code of the data processor circuit board is stored in an I.D. selector switch circuit 220 and is transmitted through a board identity amplifier 222 to the cut microprocessor 182 where it is compared with the identification code of the polling signal supplied at output 34 of the C.P.U. 38. The decoder 224 is connected at three inputs to the cut address bus 186 and has a read output 226 connected to the board identity amplifier 222 to transfer the board identity code from identity selector 220 through such amplifier to the cut microprocessor. The identification code of the polling signal is determined by the cut microprocessor 182 from the polling signal transmitted thereto from the external communication interface 214 through cut data bus 180. When the microprocessor 182 confirms that the identification code of the polling signal is the same as the identification code of the data processor board stored in the identification selector 220, it produces a read signal at output 191 which is transmitted to the timing gate 194 and then to the external communication interface 214 through output 392 of such timing gate, enabling such interface to acknowledge to the C.P.U. 38 over link 36 that the data processing board with the correct identification has been found. The C.P.U. 38 then transmits either its requests for information or its instructions to the data processing board through interface 214 over line 34. Data to be transmitted to the C.P.U. 38 from the data processing board 120 is transmitted to the cut microprocessor 182 through cut data bus 180 from data memory 188 when such data memory is appropriately addressed by the cut microprocessor 182 through the cut address bus 186 and buffer amplifier 190. The read output 191 of the cut microprocessor 182 is transmitted to the buffer amplifier 190 to cause the data memory to read out data to the external communication interface 214. Thus, data stored in the data memory 188 is transmitted through the external communication interface 214 and the buffer amplifier 218 to the data input 36 of the C.P.U. 38 when an enabling communication signal is applied at input 219 of the buffer amplifier 218 by the bus interface 172 upon receipt of a control signal from the cut microprocessor 182 through bus 180, amplifier 200 and bus 176. It should be noted that the polling signal output terminal 34 and the data input terminal 36 of the C.P.U. 38 are also connected to other data processor circuit boards 120 which have different identification codes. As a result, the C.P.U. can selectively communicate with such other circuit boards at different times in order to poll the data stored therein by using polling signals with such different identification codes.

The first decoder 224 having three inputs connected to the cut address bus 186 produces read arithmetic signals and start division and start multiplication signals at four parallel outputs 228 which are transmitted to the arithmetic unit 202. A second decoder 230 also having three inputs connected to the cut address bus 186 produces load arithmetic signals and clear arithmetic signals at four parallel outputs 232 which are transmitted to the arithmetic unit 202. The decoder 224 also produces a read analog-to-digital interface signal at output 234 which is applied to the buffer amplifier 174 to switch on such amplifier and cause the digital light signal to be transmitted from the analog to digital interface 168 through the buffer amplifier to the cut buffer data bus 176.

Decoder 230 includes a load communication register output 236 which is connected to an internal communication shift register 238 for transferring data from the cut buffer data bus 176 to an intelligent cut buffer data bus 240. The intelligent cut buffer data bus is connected through a buffer amplifier 242 to an intelligent cut data bus 244 connected to an intelligent cut microprocessor 246 similar to the cut microprocessor 182. Thus, the data signals which are stored in the data memory 188 are transferred through the register 238 to the intelligent cut microprocessor 246 which further processes the data in accordance with a computer program stored in a program memory 248 which is connected to such microprocessor through the intelligent cut data bus 244. The intelligent cut microprocessor 246 determines whether any of the discolorations on the french fried potato strips detected by the cut microprocessor are sufficiently serious to be considered a defect and whether such defect should be cut out from the potato strip depending upon the amount of waste resulting therefrom. The microprocessor 246 also locates the position of the defect with respect to the opposite ends of the potato strip as well as the length of the defect. The data on the defects is transmitted to a data memory 250 from the intelligent cut data bus 244 when a write signal is applied to such memory from write output 251 of the microprocessor 246. The data memory is connected through a buffer amplifier 252 to an intelligent cut address bus 254 which is also connected to the microprocessor 246. Data is read out of memory 250 when a read signal at read output 257 of the microprocessor 246 is applied to the buffer amplifier 252. Any cut decision signal is transmitted from the intelligent cut microprocessor 246 through the intelligent cut data bus 244 and a buffer amplifier 256 to the intelligent cut buffer data bus 240 when timing signals are applied to such amplifier from two outputs 289 A and B of the timing gate 284. The defect data is transferred through a second internal communication register 258 from the intelligent cut buffer data bus 240 to the cut buffer data bus 176 for further processing by the cut microprocessor 182 to produce the defect cutting signals.

Figure 13:
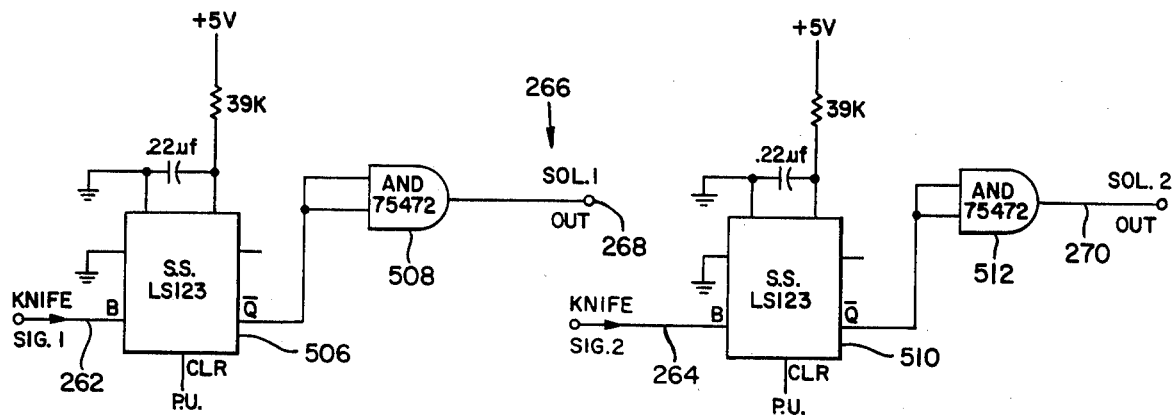

The defect cutting signals are transmitted from the cut microprocessor 182 through cut data bus 180 and buffer amplifier 200 to the cut buffer data bus 176 and are loaded into the bus interface 172 when an interface load signal is produced at output 260 of the decoder 230 and applied to the bus interface. The bus interface generates a first knife signal at output 262 and a second knife signal at output 264 which are connected to the inputs of a knife control circuit 266. The knife control circuit 266 is shown in FIG. 13 and produces a first knife driver signal at output 268 and a second knife driver signal at output 270 which are connected to a knife solenoid valve control circuit shown in FIG. 14 for actuating the two solenoid valves 114 and 116 of FIG. 7. Each solenoid valve is controlled by a separate control circuit shown in FIG. 14, in the manner hereafter described.

A third decoder 272 having its load output 274 connected to the second internal communication register 258 transfers data from the intelligent cut buffer data bus 240 to load such shift register. Data is read out of the second shift register 258 to the cut buffer data bus 176 when a read signal is transmitted from a read output terminal 276 of the first decoder 224 to shift register 258. In a similar manner, the first shift register 238 is loaded when a load signal is transmitted from the load output 236 of the second decoder 230 to such shift register. Also, the data in the first shift register 238 is read out to the data bus 240 by a read signal applied thereto from the read output 278 of a fourth decoder 280. Thus, decoders 272 and 280 serve a similar function to decoders 230 and 224, respectively. Decoders 272 and 280 both have three of their inputs connected to the intelligent cut address bus 254 so that addres signals produced by the microprocessor 246 control such decoders. Decoders 272 and 280 are also controlled by write and read signals at the outputs 251 and 257, respectively, of microprocessor 246. A timing gate 284 has four control inputs including write input 251, read input 257, and two timing gate signals 288A and B. A two megahertz clock signal at output 286 of the oscillator, clock and timer circuit 196 is also applied to the timing gate. Timing gate 284 is gated by input signals from outputs 288A and B of the intelligent cut microprocessor, and applies a timing signal from output 282 to decoders 272 and 280. The timing gate also applies gating signals 289A and B from output 289 to the buffer amplifiers 242 and 256 to turn on such amplifiers.

Decoders 272 and 230 both produce dead man signals at outputs 290 and 292, respectively, which are applied to dead man switch circuits in the form of single shot multivibrators 294 and 296, respectively, whose outputs are coupled to the microprocessors 246 and 182, respectively. The single shot multivibrators 294 and 296 act to reset the microprocessors 246 and 182 to a program datum in the event that the data processor system is not operating properly.

An intelligent cut interrupt signal is transmitted from the output 298 of the oscillator, clock and timer circuit 196 to a flip/flop bistable multivibrator 300 which temporarily stops data processing in the intelligent cut microprocessor 246 and synchronizes new data acquisition. After such interrupt signal is sensed by the microprocessor it produces an interrupt acknowledge signal at outputs 503 which reverts the flip/flop 300 to its initial quiescent state to enable further processing of the data.

Another memory decoder 302 is connected between the program memory 248 and the data memory 250. In addition, the memory decoder 302 is connected to the intelligent cut address bus 254 and to timing output 303 of the timing gate 284 so that address signals from microprocessor 246 control such decoder. Thus, the decoder operates in a similar manner to decoder 192 connected between memories 184 and 188. The intelligent cut microprocessor 246 is also connected to the inverted reset output 208 and the four megahertz clock signal output 210 of the oscillator, clock and timer circuit 196 for controlling such microprocessor. Thus, the intelligent cut microprocessor and its associated circuitry is similar in circuit connection to the connection of the cut microprocessor 182 and its associated circuitry. However, the arithmetic unit or multiply and divide processor 202 is only connected to the cut microprocessor 184 through the cut buffer data bus 176, and is not connected to the intelligent cut microprocessor 246. Also, the external communication link including the buffer amplifiers 216, 218 and the external communication interface 214 is only connected to the cut microprocessor 182 through the cut data bus 180 and is not connected to the intelligent cut microprocessor 246. However, the defect data stored in data memory 250 is transmitted through register 258 to the cut microprocessor 182 so that it is also supplied to the C.P.U. 38 through the external communication interface 214.

A timing flip/flop 304 is provided for the analog-to-digital interface 168. One input of the flip/flop 304 is connected to the two megahertz clock signal output 198 of the oscillator, clock and timer circuit 196 and another input is connected to a read output 306 of decoder 230. Thus, the flip/flop 304 produces a start signal at its output 308 which starts the analog-to-digital converter in the interface 168. Finally, a carry-in signal is produced at output 310 of the bus interface 172 and transmitted to the arithmetic unit 202 in order to control its operation.

As shown in FIG. 9, the analog amplifier circuit 166 includes three infrared signal amplifier circuits each connected to one of the input terminal pairs 167 and including a preamplifier 312 and a power amplifier 314 connected to the output of such preamplifier which may be both type LF347 integrated circuits. The output of the power amplifier is connected to one of three infrared signal inputs 315 of a multiplexer switching circuit 316 which may be a type LF11508 integrated circuit. The multiplexer 316 forms part of the analog-to-digital interface 168 of FIG. 8, and also has three visible light signal inputs 317 connected to the outputs of three similar visible light signal amplifier circuits each connected to one of the input terminal pairs 165. Each visible light amplifier circuit includes a preamplifier 318 and a power amplifier 320 connected to the output of such preamplifier, which may also both be type LF347 integrated circuits. The negative input of each preamplifier 318 is connected to one of the visible light signal inputs 165 and its positive input is connected to ground through a bias resistor 321 of one megohm. The output of preamplifier 318 is connected to the negative input of the amplifier 320 whose positive input is connected to ground through a bias resistor 322 of 10 kilohms and to the movable contact of a potentiometer 323 of one megohm connected between +15 and −15 volts D.C. voltage sources. Similarly, the negative input terminal of each preamplifier 312 is connected to one of the infrared signal inputs 167, and its positive input is connected to ground through a bias resistor 325 of one megohm. The output terminal of preamplifier 312 is connected to the negative input of the power amplifier 314 whose positive input terminal is connected to ground through a bias resistor 324 of 10 kilohms and to the movable contact of a potentiometer of one megohm connected between +15 and −15 volt D.C. voltage sources. Each of the preamplifiers 312 and 318 and each of the amplifiers 314 and 320 has a parallel RC shunt impedance connected between its negative input and its output for signal waveform shaping with the shunt resistors of amplifiers 314 and 320 being a variable resistance potentiometer.

The multiplexer 316 is connected to the interface 172 of FIG. 8 at three multiplex control inputs 170 which supply multiplexer switching signals mux. 0, mux. 1, mux. 2 for switching such multiplexer to select between the analog signal inputs supplied by the three visible light signal amplifier circuits and the three infrared light amplifier circuits. The multiplexer 316 transmits an analog light signal from output 329 to the positive input of an emitter follower amplifier circuit 326 which may be a type LF351 integrated circuit. The output of the emitter follower amplifier 326 is connected to its negative input and through a load resistor 328 of two kilohms to the positive input of a comparator circuit 330 of an LM319 type which is also connected to the output of a digital to analog converter 331 of a DAC 08 type. The negative input of the comparator circuit 330 is connected to ground through a bias resistor 332 of two kilohms.

The output of the comparator circuit 330 is connected through a load resistor 334 of 10 kilohms to a +5 volt D.C. supply voltage and is also connected through a feedback conductor 336 to one input of a successive approximation register 338 of a AM2502 type. The successive approximation register has a second input 340 connected to the two megahertz clock output 198 of the oscillator, clock and timer circuit 196. The third input 342 of such successive approximation register is connected to the start signal output 308 of the flip/flop or bistable multivibrator circuit 304 which is triggered by the start A/D output 306 of decoder 230 of the data processor system of FIG. 8. The flip/flop circuit 304 includes a first flip/flop stage 344 having its input connected to the start A/D output 306 and having one output connected to the input of a second flip/flop stage 346 which has another input connected to the clock line 198. The output 308 of flip/flop 346 is connected to input terminal 342 of the register 338 to start the operation of such register and is connected to reset input 347 of flip/flop 344 to reset it which in turn resets flip/flop 346. At beginning of the cycle when reset by the start signal at 342, the successive approximation register sets itself with all output lines 348 turned on with the exception of the line for the most significant bit (MSB). In this condition such register will check the feed back signal 336 of comparator 330. If signal 336 is turned on, then the analog light signal transistor 328 is larger than the analog at the digital output signal then being produced by digital-to-analog converter 331 from the digital signal on the 8 output lines 348 from successive approximation register 338. If the feed back signal on feed back conductor 336 is off, then the reverse is true. Thus, the successive approximation register can test whether the number it is generating is too large or too small to represent the analog light signal from register 328. If the number it is generating on the 8 parallel lines 348 is too large, the MSB line is left turned off. If it is too small, the MSB is turned on. Each successively smaller bit from the MSB to the least significant bit (L.S.B.) is adjusted in the same manner described above. When all 8 bits have been so adjusted, the digital output signal on outputs 348 will correspond in value within reasonable limits to the amplitude of the analog light signal from resistor 328, and will stay at this value until reset by the start signal at 342. Thus, the digital-to-analog converter 331 and the successive approximation register 338 together with the comparator 330 form an analog-to-digital converter which converts the analog light signals into digital light signals at the outputs 348 of the successive approximation register. The digital light signal is then transmitted through an eight conductor digital light signal bus 352 connected to outputs 348 and is applied to a corresponding number of inputs of the buffer amplifier 174 of LS244 type which transfers such digital light signal to the cut buffered data bus 176 when a read A/D control signal is applied thereto by output 234 of decoder 224.

A D.C. reference voltage of about +10 volts is produced at the output 356 of a voltage generator 358 of LH00-70-2H type having its two inputs connected to a +15 volt D.C. supply voltage and ground. Such reference voltage is applied to the digital analog converter 331. Also, it should be noted that the output flip/flop stage 346 has two terminals "P.U." connected to pull-up voltage sources which each include a 1.2 kilohm resistor in series with a +5 volt D.C. supply voltage, and are used throughout the data processor system circuitry.

As shown in FIG. 9, the external communication interface circuit 214 is a universal synchronous/asynchronous receiver/transmitter integrated circuit chip of type INS8251A, sometimes referred to as a "USART". The buffer amplifiers 216 and 218 connected to such interface are, respectively, 26LS32 and 26LS31 type integrated circuits. The external communication interface 214 is connected to the C.P.U. 38 at input 34 and output 36 through the buffer amplifiers 216 and 218, and is connected to the cut data bus 180 by eight lines in the manner previously described with respect to the system of FIG. 8.

Figure 10:
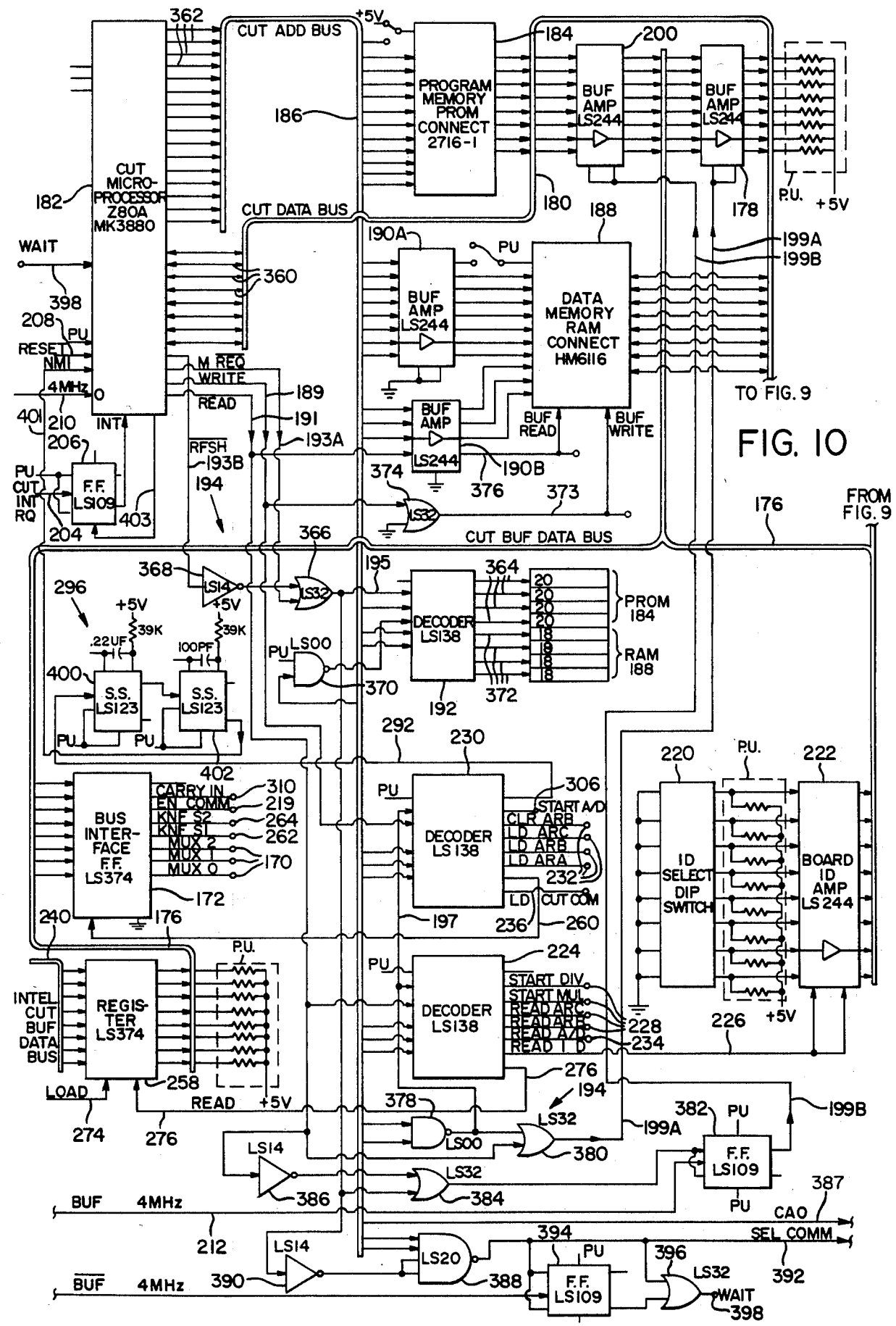

As shown in FIG. 10, the cut microprocessor 182 is a general-purpose digital computer, such as a Z80A microprocessor which may be the type MK3880 integrated circuit made by Mostec, Inc. The microprocessor is supplied with digital light signals or data from the cut buffered data bus 176 through the buffer amplifier 178 of LS244 type and the cut data bus 180 which is connected between the eight outputs of such amplifier and eight input/output terminals 360 of such microprocessor. The cut microprocessor 182 is also connected at sixteen address output terminals 362 to the cut address bus 186. The program memory 184 has its inputs connected to the cut address bus 186 and its outputs connected to the cut data bus 180 for supplying program steps to the cut microprocessor. The program memory 184 may include four PROM's, each of four kilobytes memory, such as a type 2716-1 integrated circuit. One terminal of each PROM is connected to a different one of the four outputs 364 of the decoder 192 to control the transfer of stored program steps therefrom. Three inputs of the decoder 192 are connected directly to the cut address bus 186 while another input connected to output 195 of the timing gate circuit 194 which includes an OR gate 366 of the type LS32. One input of the OR gate is connected to the memory request (MREQ) output 193A of the microprocessor and its other input is connected through a Schmidt trigger circuit 368 of type LS14 to an memory refresh (RFSH) output 193B of the microprocessor which supplies timing signals to such timing gate circuit. Another input of the decoder 192 is connected through a NAND gate 370 of type LS00 having one input connected to the cut address bus 186 and having its other input connected to a pull-up voltage terminal.

The data memory 188 has its inputs connected through buffer amplifier stages 190A and 190B, both of LS244 types, to the cut address bus 186 and is connected at its input/output terminals to the cut data bus 180. The data memory 188 may consist of four RAM memories each of 2 kilobytes such as a type HM6116 memory. Each RAM has one input 372 connected to one of four other outputs 372 of the decoder 192 for controlling the transfer of data signals to and from such data memory. The buffered write input 373 of data memory 188 is connected to the write output 189 of the microprocessor 182 through an OR gate 374 of a type LS32 whose other input is grounded, to control when data is written into the data memory 188 from cut data bus 180. The data memory 188 has a buffered read input terminal 376 connected through the buffer amplifier 190B to the read output 191 of the cut microprocessor 182 to control when data is read out of the data memory to the cut data bus 180.

Figure 11:
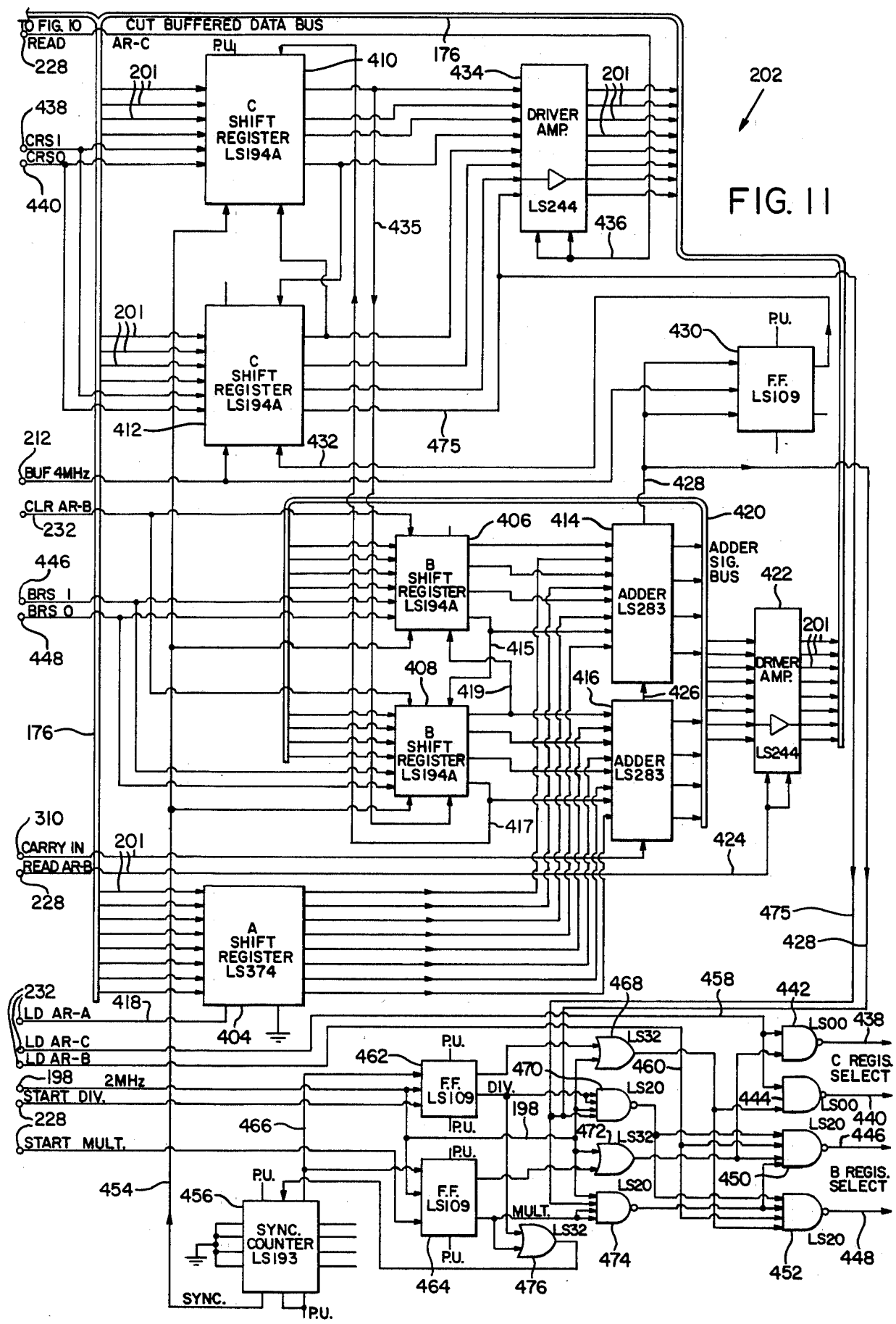

The decoder 230 is a type LS138 integrated circuit connected at three inputs to the cut address bus 186 and is connected at four outputs 232 to the arithmetic unit 202 of FIG. 8 to control such arithmetic unit. Thus, the four control signals of the decoder 230 on output terminals 232 are a clear arithmetic unit B register signal, load arithmetic unit C register signal, load arithmetic unit B register signal and load arithmetic unit A register signal, respectively. In addition, the decoder 230 produces at output 306 a start A/D signal which starts the analog-to-digital converter in means 338, 331 and 330 of FIG. 9 in interface 168 when such signal is applied to the flip/flop 304 to cause it to produce output 308. The decoder 230 also produces a load cut communication signal at output 236 which is applied to the shift register 238 to load cut data into such register. In addition, such decoder also produces a load bus interface signal at output 260 which is applied to the bus interface 172 to load data into such interface from cut buffered data bus 176. The decoder 230 has a write input signal applied to the input thereof from the output 189 of the cut microprocessor which causes the outputs 232 of decoder 230 to load data into the arithmetic unit 202 as shown in FIG. 11. Timing signals are applied to one input of each of the decoders 224 and 230 from the output 197 of the timing gate circuit 194 at the output of NAND gate 378 of type LS00 having two inputs connected to the cut address bus 186.

The decoder 224 is also a type LS138 integrated circuit and has three inputs connected to the cut address bus 186. A fourth input of decoder 224 is connected to the read output 191 of the cut microprocessor for reading information out of the arithmetic unit 202 connected to four output terminals 228. The output terminals 228 supply a start division signal, a start multiplication signal, a read arithmetic C register signal, and a read arithmetic B register signal to the arithmetic unit 202 of FIG. 11. In addition, the decoder 224 produces a read A/D signal at output 234 which is applied to buffer amplifier 174 of FIG. 9 and causes the analog-to-digital interface 168 to be read out through such buffer amplifier. The decoder 224 also supplies a read signal at output 276 to the internal communication register 258. The decoder 224 produces a read identification output signal at output 226 which is applied to the board identity amplifier 222 of an LS244 type. The read identification signal at output 226 causes the identification code of the board stored in identity selector 220 to be transmitted through the amplifier 222 to the cut buffered data bus 176 and then through buffer amplifier 178 and cut data bus 180 to the cut microprocessor 182. Such microprocessor then compares such code with the identification code of the polling signal applied to the external communication interface 214 by the central processing unit 38. Power for the I.D. selector 220 is supplied by a pull-up voltage circuit, P.U., including a plurality of resistors connected in series with a +5 volt D.C. supply and to the common connections of the I.D. selector 220 and the board identification amplifier 222.

The timing gate circuit 194 includes an OR gate 380 of type LS32 having one input connected to the timing signal output 197 of NAND gate 378 and having its other input connected to the read output 191 of the cut microprocessor. The OR gate 380 produces a read signal output 199A which is applied to the buffer amplifier 178 to cause such buffer amplifier to transmit data from the cut buffer data bus 176 to the cut data bus 180. The timing gate circuit 194 also includes a flip/flop 382 of type LS109 which produces another read signal output 199B that is applied to the buffer amplifier 200 in order to cause such buffer amplifier to transmit data from the cut data bus 180 to the buffered data bus 176. The flip/flop 382 has one input connected to the buffered 4 megahertz output 212 of the oscillator, clock and timer circuit 196 of FIG. 8, and has its other input connected to the output of an OR gate 384 of type LS32. One input of the OR gate 384 is connected to the output of the OR gate 366, while its other input is connected through a Schmidt trigger circuit 386 of type LS14 to the read output 191 of the cut microprocessor 192, such Schmidt trigger acting as a signal delay.

A cutter address zero signal is supplied on line 387 from the cut address bus 186 to the external communication interface 214 of FIG. 9. In addition, the timing circuit includes a NAND gate 388 of type LS20 having two inputs connected to the cut address bus 186 and having two other inputs connected to the output of a Schmidt trigger circuit 390 of type LS14 whose input is connected to the output of the OR gate 366. The output of the NAND gate 388 supplies a select communication signal output 392 which is applied to the external communication interface 214 of FIG. 9 to control the operation of such interface. The output of the NAND gate 388 of FIG. 10 is also connected to two inputs of a flip/flop 394 of type LS109 whose other input is connected to an inverse buffered four megahertz output signal of the oscillator, clock and timer circuit 196. The flip/flop 394 has its output connected to one input of an OR gate 396 of the LS32 type whose other input is connected to the output of the NAND gate 388. OR gate 396 produces a wait signal on its output conductor 398 which is connected to an input of the cut miocroprocessor 182 to momentarily stop signal processing by such microprocessor when the external communication interface 214 is being operated.

The single shot dead-man switch circuit 296 is a pair of single shot monostable multivibrator circuits 400 and 402, both of a type LS123. The input stage single shot 400 is connected at its input to the output 292 of the decoder 230, while the output of such input stage is connected to the input of the output stage single shot 402. The output of the output stage 402 supplies a non-maskable interrupt ($\overline{NMI}$) signal to the cut microprocessor at the $\overline{NMI}$ input 401 thereof. The cut interrupt flip/flop 206 is an LS109 type bistable multivibrator connected at its output to the cut microprocessor to temporarily interrupt data processing thereby as discussed above. Flip/flop 206 is triggered by the cut interrupt signal at input 204 and is reverted by an interrupt acknowledge signal at output 403 of the cut microprocessor 182. It should be noted that pull-up voltage circuits, P.U., including a plurality of resistors in series with a +5 volt supply are connected to the outputs of buffer amplifier 178, to the outputs of the shift register 258 and to the common connections of the identify selector circuit 220 and the board identification amplifier circuit 222.

The circuit of the arithmetic unit 202 is shown in FIG. 11, and includes an A shift register 404 of the LS374 type, a pair of B shift registers 406 and 408 of the LS194A type and a pair of C shift registers 410 and 412 of the LS194A type. Four outputs of the A shift register 404 are connected to inputs of a first adder 414 of the LS283 type and four outputs of the first B shift register 406 are connected to different inputs of such adder. One output 415 of the first B shift register is connected as an input of the second B shift register. A second adder 416 of the LS283 type has four inputs connected to the other four outputs of the A shift register 404 and has four additional inputs connected to the outputs of the second B shift register stage 408 which may also be of the LS194A type. One output 417 of the B shift register 408 is also connected to an input of the C shift register 410, while another output 419 is connected to an input of the other B shift register 406. Eight inputs of the A shift register 404 are connected to the cut buffer data bus 176 and data is loaded into such A shift register when a load arithmetic A register signal (LD AR-A) is supplied to a ninth input 418 from the output 232 of the decoder 230 of FIG. 10. The four outputs of each of the adders 414 and 416 are connected to an adder signal bus 420 consisting of eight parallel lines which are each also connected to one of the four inputs of each of the two B shift register stages 406 and 408. The adder signal bus 420 is also connected through a driver amplifier 422 of type LS244 to the cut buffer data bus 176. Control inputs 424 of the driver amplifier 422 are connected at a read arithmetic B register signal (Read AR-B) at one of the outputs 228 of decoder 224 to switch such amplifier on and transfer adder signal data therethrough.

A carry-in signal input 310 from the bus interface 172 of FIG. 8 is applied to a control input of the second adder 416 and causes such second adder to carry its total into the first adder 414 at output 426. As a result, the first adder 414 produces a carry out signal at output 428 which is applied to two inputs of a flip/flop 430 of type LS109. A third input of the flip/flop 430 is connected to the buffered four megahertz signal input 212. The output of flip/flop 430 is connected to input 432 of the second C shift register 412. The four outputs of each of the two C shift registers 410 and 412 are connected to different ones of eight inputs of a driver amplifier 434 of type LS244. Also, one output 435 of the first C shift register 410 is connected as an input of the second B shift register 408. The eight outputs 201 of the driver amplifier 434 are connected to the cut buffered data bus 176. The driver amplifier is read out by a read arithmetic C register signal (Read AR-C) at input 436 which is produced at another of the outputs 228 of the decoder 224 in FIG. 10, which turns on amplifier 434, thereby causing the driver amplifier to transmit the output signals of the two shift registers onto the cut buffered data bus.

The C shift registers 410 and 412 are supplied with C register select 1 and 0 signals (CRS 1 and CRS 0) at inputs 438 and 440 connected to the ouputs of NAND gates 442 and 444, respectively. Similarly, the B shift registers 406 and 408 are each connected to B register select 1 and 0 signals (BRS 1 and BRS 0) at inputs 446 and 448 which are connected to the outputs of NAND gates 450 and 452, respectively. Thus, input signals on C register selet inputs 438 and 440 load data into the C shift registers 410 and 412, while input signals on B register select inputs 446 and 448 load data into the B shift registers 406 and 408. It should be noted that all of these shift registers are synchronized by a sync signal produced at output 454 of a sync counter 456 of type LS193. One input of each of the NAND gates 442 and 444 is connected to a load arithmetic C register signal on line 458, while the NAND gates 450 and 452 are each connected at one of their inputs to the load arithmetic B register signal on line 460 at two of the outputs 232 of the decoder 230 of FIG. 10. Thus, the NAND gates 442 and 444 provide select signals to the C registers 410 and 412 at outputs 438 and 440, and NAND gates 450 and 452 provide select signal to the B registers 406 and 408 at outputs 446 and 448.

Synchronization of the loading of the B shift registers and the C shift registers by the register select signals at outputs 438, 440, 446 and 448 is accomplished by a pair of flip/flops 462 and 464 of type LS1209, each having one of their inputs connected to a two megahertz clock output 198 of the oscillator, clock and timer circuit 196 of FIG. 8. Another input of flip/flop 462 is connected to a start division signal output 228 of decoder 224 while another input of flip/flop 464 is connected to a start multiplication output 228 of such decoder. In addition, both of the flip/flops 462 and 464 have a third input connected to the output 466 of the synchronizing counter 456. One output of flip/flop 462 in FIG. 11 is connected to the input of an OR gate 468 of a type LS32 whose other input is connected to the two megahertz clock signal on line 198. The output of OR gate 468 is connected to one of the inputs of NAND gate 444 and of NAND gate 452. The other output of flip/flop 462 applies a division start signal to two inputs of a NAND gate 470 of type LS20 having a third input connected to the two megahertz clock line 198, and having a fourth input connected to the carry out signal output 428 of adder 414. The output of NAND gate 470 is connected to one input of NAND gate 450 and to one input of NAND gate 452 to transmit the divison start signal through such NAND gates to the B shift registers to cause such registers to begin division. The first output of the second flip/flop 464 is connectd to the input of an OR gate 472 of type LS32 whose other input is connected to the two megahertz clock line 198, and whose output is connected to one input of NAND gate 442 and NAND gate 450. The second output of flip/flop 464 applies the start multiplication signal to two inputs of another NAND gate 474 of type LS20 having a third input connected to the two megahertz clock line 198 and having a fourth input connected to the C shift register output 475 of the C shift register 412. The output of the NAND gate 474 applies a multiplication start signal to the inputs of NAND gates 450 and 452 to cause the B shift registers to begin multiplication.

An additional OR gate 476 of type LS32 is provided with two inputs connected, respectively, to the divison signal output of flip/flop 462 and to the multiplication signal output of flip/flop 464. The output of such OR gate is connected to the input of the synchronizing counter 456 which counts when such division or multiplication start signals are produced by the flip/flops, and produces a synch signal at the output 454 of such counter which is applied to the B shift registers and the C shift registers for synchronization as previously indicated. The above described gate circuit controls when the C register select signals are transmitted from gates 442 and 444 to the C shift registers 410 and 412, and also controls when the B register select signals are transmitted from NAND gates 450 and 452 to the B shift registers 406 and 408 in response to the receipt of "load arithmetic unit B shift register" (LD-AR-B) signals on line 460. This operates the shift registers and causes them to produce on data bus 176 the ratio signal of visible light reflection divided by infrared light reflection of the potato strip.

Figure 12:
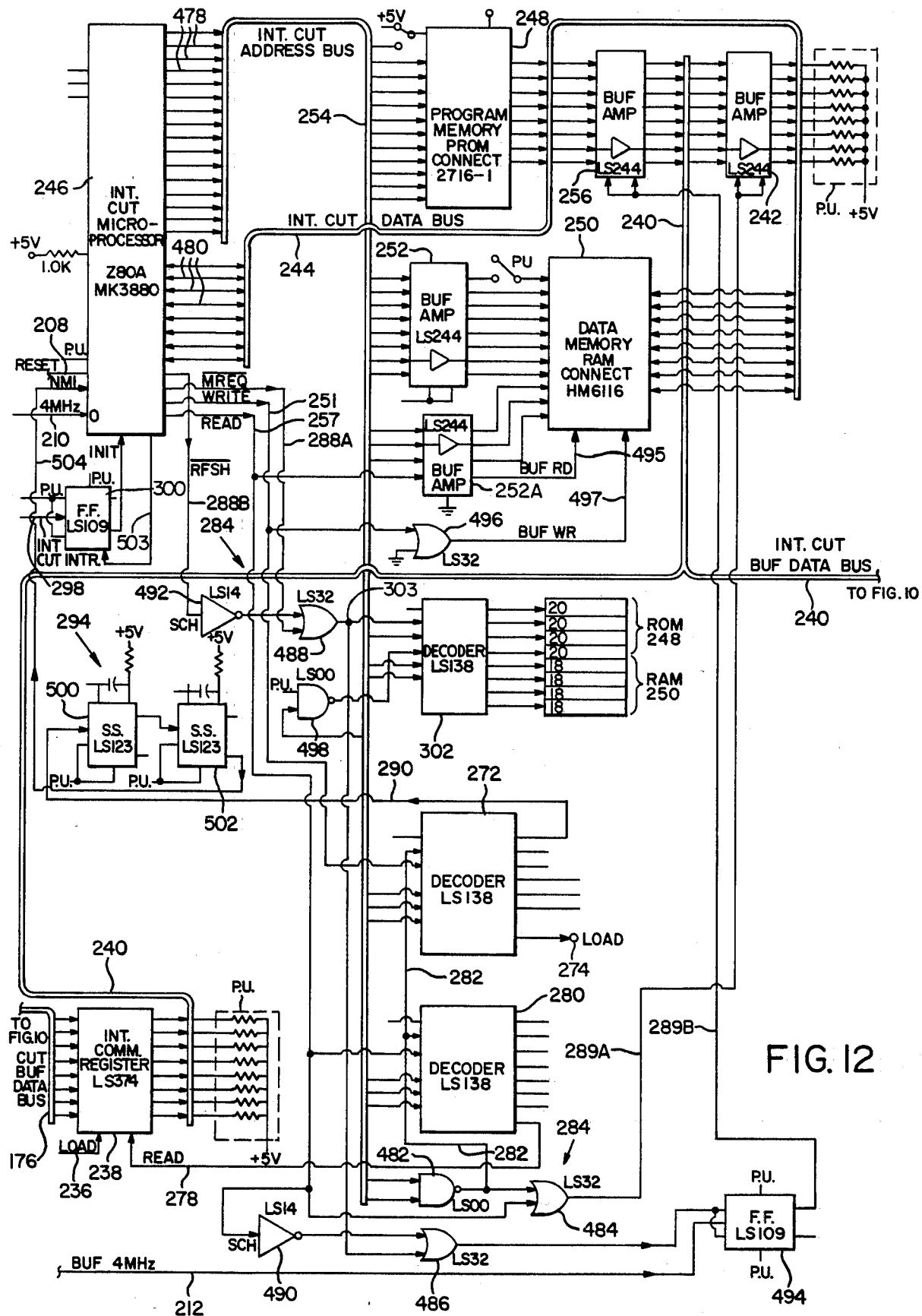

As shown in FIG. 12, the intelligent cut microprocessor 246 is a Z80A microprocessor of a type MK3880, which is connected at sixteen outputs 478 to the intelligent cut address bus 254 and is connected at eight input/output terminals 480 to the intelligent cut data bus 244. Eight bit digital data signals are supplied to the microprocessor 246 from the intelligent cut buffered data bus 240 through buffer amplifier 242 of type LS244. Eight bit data signals are supplied from the microprocessor 246 to the intelligent cut buffered data bus 240 through buffered amplifier 256 of LS244 type. Data is transmitted from the cut buffered data bus 176 through the internal communication register 238 of type LS374 to the intelligent cut buffered data bus 240. After data is loaded into the register 238 from the cut buffered data bus 176 upon application of a load signal to input 236 of such register, the data is read out by applying a read signal to control input 278 of such register from the output of the decoder 280. The decoder 280 is of a type LS138 and has three inputs connected to the intelligent cut address bus 254 and a read input terminal connected to the read output 257 of the intelligent cut microprocessor 246.

A timing signal is applied to one input of decoder 280 from the timing output 282 of the timing gate circuit 284 at the output of a NAND gate 482 of type LS00 forming part of such timing gate circuit. The two inputs of the NAND gate 482 are connected to the intelligent cut address bus 254, and its output is also connected to one input of an OR gate 484 of type LS32. The other input of the OR gate is connected to the read output 257 of the microprocessor 246. The output of OR gate 484 is connected through line 289A to the read inputs of buffer amplifier 242. The timing gate circuit 284 also includes an OR gate 486 of type LS32 having one input connected to the timing output 303 of another OR gate 488 of type LS32, and the other input of OR gate 486 is connected through a Schmidt trigger circuit 490 of type LS14 to the read output 257 of the microprocessor 246. The inputs of the OR gate 488 are connected to the memory request or $\overline{MREQ}$ output of microprocessor 246 and through a Schmidt trigger 492 of type LS14 to the refresh or $\overline{RFSH}$ output of such microprocessor. When the OR gate 486 recieves a timing input signal from the output 303 of OR gate 488 or a read input from the output of the Schmidt trigger 490, it produces an output signal which is applied to a flip/flop circuit 494 of type LS109. The buffered four megahertz clock signal on output 212 of the oscillator, clock and timing circuit 196 is applied to another input of the flip/flop 494 to time the transfer of data through the buffer amplifier 256. The flip/flop 494 is switched by its input signals to produce a read output signal which is applied through line 289B to the read inputs of the buffer amplifier 256. Thus, the read signals at read inputs 289A and 289B of buffer amplifiers 242 and 256, respectively, control when data is transferred through such amplifiers.

The connections of the program memory 248 and the data memory 250 to the intelligent cut address bus 254 to the buffer amplifiers 252 and 252A of type LS244 and to the decoder 302 of type LS138 are the same as that previously described with respect to the data memory 194 and the program memory 188 of the cut microprocessor shown in FIG. 10. In addition, one input of the buffer amplifier 252A is connected to the read output 257 of the intelligent cut microprocessor 246 and applies a buffered read signal to read input 495 of the data memory 250. Also, the write output 251 of the microprocessor 246 is connected to one input of an OR gate 496 of type LS32 whose other input is grounded and whose output is connected to apply a buffer write signal to a write input 497 of the data memory 250. The program memory 248 is a type 2716-1 integrated circuit, while data memory 250 is a type HM6116 integrated circuit. Three inputs of the decoder 302 are connected to the intelligent cut address bus 254. Another input of deoder 302 is connected to the timing output 303 of OR gate 488 of type LS32 while a fifth input is connected to the output of an AND gate 498 having one input connected to the intelligent cut address bus and having its other input connected to the pull up voltage source.

The decoder 272 may be of a type LS138 having three inputs connected to the intelligent cut address bus 254, a fourth input connected to the timing signal output 282 of the timing gate circuit 284 at the output of a NAND gate 482 of type LS00 in such timing gate circuit. The decoder has a fifth input connected to the write output 251 of the intelligent cut microprocessor 246. The decoder 272 produces a load signal at output 274 which is applied to the internal communication register 258 of FIG. 10 for transferring data from the intelligent cut buffered data bus 240 to the cut buffered data bus 176. The decoder 272 also produces at output 290 a dead man switch output signal which is applied to the input of a dead man switch circuit 294. The dead man switch circuit 294 includes a first stage single shot monostable multivibrator 500 connected at its output to the input of a second stage single shot 502 which are both of type LS123 integrated circuits. The output of the second stage 502 is connected through line 504 to the NMI input of the microprocessor 246.

Interrupt flip/flop 300 which may be a type LS109 integrated circuit has its trigger input connected to the intelligent cut interrupt signal output 298 of the oscillator, clock and timer circuit 196 of FIG. 8. When flip/flop 300 is triggered it applies an interrupt signal to the INIT input of microprocessor 246 which interrupts the data processing operation of the intelligent cut microprocessor to enable it to receive new data. The microprocessor 246 produces an interrupt acknowledge signal at output 503 which reverts the flip/flop 300 to its initial state.

The knife control circuit 266 of the system of FIG. 8 is shown in FIG. 13. The knife control circuit includes a first single shot monostable multivibrator 506 of a type LS123 having its input connected to the knife signal #1 output 262 of the bus interface 172. The $\overline{Q}$ output of the single shot 506 is connected to both inputs of an AND gate 508 of a type 75472 whose output is connected to the solenoid #1 control output 268. The knife signal #2 output 264 of the bus interface 172 is connected to the input of a second signal shot multivibrator stage 510 of a type LS123. The $\overline{Q}$ output of single shot 510 is connected to both inputs of a second AND gate 512 of type 75472 whose output is connected to the solenoid #2 control output 270. Thus, first and second solenoid control outputs 268 and 270 are connected respectively to the solenoid valves 114 and 116 of FIG. 7 through a solenoid drive circuit of the type shown in FIG. 14.

Figure 14:
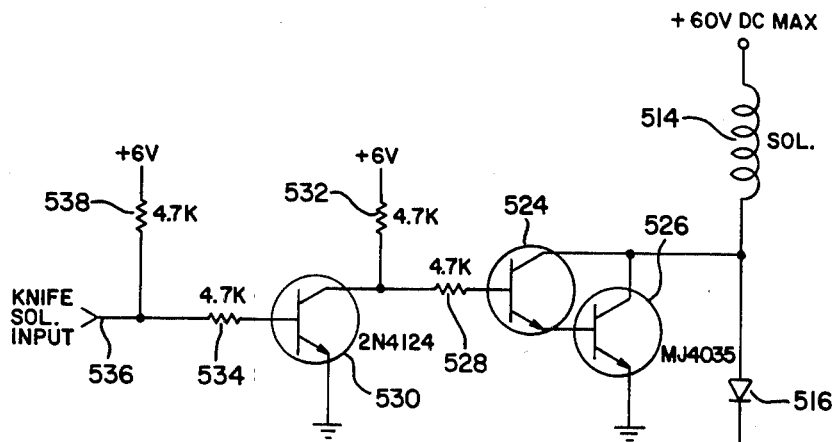

As shown in FIG. 14, each of the two solenoid drive circuits connected to outputs 268 and 270 includes a solenoid inductance coil 514 connected at one end to a source of +40 to +60 volt D.C. supply voltage. The other end of coil 514 is connected to the anode of a diode 516. The cathode of diode 516 is connected to the cathode of Zener diode 518 whose anode is connected to the base of a first NPN transistor 520. Transistor 520 has its emitter connected to the base of a second NPN transistor 522 whose emitter is grounded and whose collector is connected in common with the collector of transistor 520 and to the cathode of diode 516. Thus, transistors 520 and 522 form a Darlington pair of type MJ4035. The lower terminal of the solenoid coil 514 is also connected to the common collector of another pair of NPN transistors 524 and 526 forming a second Darlington pair of type MJ4035. Thus, the emitter of transistor 526 is connected to ground while its base is connected to the emitter of transistor 524 and the collectors of such transistors are connected together. The base of transistor 524 is connected through a coupling resistor 528 of 4.7 kilohms to the collector of an input switching transistor 530 of NPN type 2N4124 whose emitter is grounded and whose collector is connected through a load resistor 532 of 4.7 kilohms to a +6 volt D.C. supply. The base of transistor 530 is connected through a coupling resistor 534 of 4.7 kilohms to the input terminal 536 of the solenoid driver circuit and is also connected through a bias resistor 538 of 4.7 kilohms to a +6 to 6.5 volt D.C. supply voltage. Switching transistor 530 is an NPN transistor normally biased conducting and is rendered non-conducting by a negative going solenoid control signal applied to the solenoid control input 536 by one of the two solenoid control outputs 268 and 270 of the knife control circuit 266 of FIG. 13. The solenoid control signal applied to input 536 is a negative going rectangular voltage pulse of 2.0 milliseconds width whose amplitude changes from +6.0 to 6.5 volts to zero volts. Transistors 524 and 526 are normally biased non-conducting and are rendered conducting when transistor 530 is switched to a non-conducting state causing a positive voltage pulse to be applied to the base of transistor 524. When transistors 524 and 526 are rendered conducting, current flows through the solenoid coil 514 from the +40 to +60 volt D.C. supply voltage to ground at the emitter of transistor 526 to actuate the solenoid valve. This causes the solenoid valve associated with coil 514 to open, which in turn actuates one of the two cylinders 106 and 107 depending upon the movement of the spool valve 112 of FIG. 7 controlled by such solenoid valves. When transistors 524 and 526 are switched off the voltage at the bottom terminal of the solenoid coil 514 rapidly increases from 0.5 volts to a limit voltage set by the breakdown voltage of zener diode 518 and then slowly returns to the power supply voltage. Thus, the diodes 516, 518 and transistors 520 and 522 provide rapid decay of solenoid current and overvoltage protection.

The computer program for microprocessors 182 and 246 is shown in the microfiche appendix filed herewith.

It will be obvious to those having ordinary skill in the art that many changes may be made in the above described preferred embodiment of the invention. Therefore, the scope of the present invention should be determined by the following claims.

I claim:

1. Elongated food product defect removal apparatus, comprising:
   conveyor means for conveying elongated food product strips longitudinally through separate channels;

sensor means for sensing said food product strips as they are conveyed through said channels by directing radiation of at least two different frequency bands at said strips, including first detector means for detecting a first radiation frequency band which senses the opposite ends of each strip and certain defects in said strip to produce a first output signal, and a second detector means for detecting a second radiation frequency band which senses the opposite ends of said strip but does not sense said defects to produce a second output signal;

electrical circuit means for comparing said first and second output signals to determine the presence of a defect, determine the location of said defect on the strip and produce corresponding defect removal cutting signals; and cutter means for cutting said strips to remove any of said defects in said strips in response to receipt of said cutting signal.

2. Apparatus in accordance with claim 1 in which the sensor means employs light which includes said first and second radiation frequency bands that are separated in frequency.

3. Apparatus in accordance with claim 2 in which the first radiation band is visible light and the second radiation band is infrared light.

4. Apparatus in accordance with claim 1 in which the electrical circuit means includes a data processing means for processing the first and second output signals from a plurality of pairs of first and second detector means to determine the presence and location of the defect on the strip and to produce the defect cutting signal.

5. Apparatus in accordance with claim 2 in which the light is reflected from the surface of the food product strips before it is detected.

6. Apparatus in accordance with claim 5 in which the light sources emit light beams containing visible light and infrared light and the detector means includes a low pass filter for passing only visible light below a first wavelength to the first detector and a high pass filter for passing only infrared light above a second wavelength to the second detector.

7. Apparatus in accordance with claim 6 in which the food product strips are french fry potato strips and three light beams are reflected from the top and two sides of each potato strip to different pairs of three pairs of first and second detectors after each reflected beam is split into two detected beams which are transmitted to different ones of said first and second detectors.

8. Apparatus in accordance with claim 7 in which the visible light has a wavelength below about 650 nanometers and the infrared light has a wavelength above about 800 nanometers.

9. Apparatus in accordance with claim 1 in which the cutter means includes a knife blade and control means for moving said blade to cut the detected defect from the strip, which is capable of causing said blade to make two cuts in the strip and for varying the spacing between said two cuts to remove defects of different length.

10. Apparatus for cutting defects from elongated food products, comprising:

conveyor means for conveying a plurality of elongated food products longitudinally in a conveying direction;

sensor means for sensing said food products and detecting any defects in said food products as they are conveyed in said conveying direction past said sensor means to produce electrical output signals corresponding to the sensed products and detected defects, said sensor means including at least two light sensor systems and associated light detector means for simultaneously sensing each food product from different directions;

electrical circuit means including data processor means for processing said output signals to determine the presence of a detect in said food products and to produce a corresponding defect cutting signal; and cutter means for cutting said food products as they are conveyed past said cutter means to remove said defects in response to the receipt of said cutting signal, said cutter means including a moving knife blade means which moves in response to the cutting signal to cut out the defect;

said conveyor means conveying the food products in a plurality of separate channels;

said sensor means including a plurality of sensor means each associated with a different one of said channels;

said cutter means includiing a plurality of cutter means each provided in a different one of said channels and controlled by the output signals of a different one of said sensor means associted with said cutter means;

said electrical circuit means including a plurality of data processor means one for each channel with each data processor means connected to a different pair of associated sensor means and cutter means, each said data processor means receiving the output signals of said associated sensor means, for processing the output signals to determine the length of the food product sensed, the presence of a defect and the position of the defect on the product, and for transmitting corresponding defect cutting signals to the associated cutter means; and a central data processing unit connected to each data processor means through multiplexing means, for polling said plurality of data processor means as to the number of food products sensed and the number of defects cut, for storing this information, and for clearing the memories of the plurality of data processor means after polling and storage.

* * * * *

UNITED STATES PATENT AND TRADEMARK OFFICE
CERTIFICATE OF CORRECTION

PATENT NO. : 4,576,071

DATED : March 18, 1986

INVENTOR(S) : Arthur G. Rayment

It is certified that error appears in the above-identified patent and that said Letters Patent is hereby corrected as shown below:

Column 16, line 25, "staqe" should read -- stage --;
Column 26, Claim 10, line 20, "detect" should read
-- defect --.

Signed and Sealed this

Sixteenth Day of September 1986

[SEAL]

Attest:

DONALD J. QUIGG

Attesting Officer

Commissioner of Patents and Trademarks